US006804819B1

(12) United States Patent
Bates et al.

(10) Patent No.: US 6,804,819 B1
(45) Date of Patent: Oct. 12, 2004

(54) METHOD, SYSTEM, AND COMPUTER PROGRAM PRODUCT FOR A DATA PROPAGATION PLATFORM AND APPLICATIONS OF SAME

(75) Inventors: John W. Bates, Mendon, MA (US); Nicos A. Vekiarides, Dedham, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 09/665,583

(22) Filed: Sep. 18, 2000

(51) Int. Cl.⁷ .............................. G06F 3/00; G06F 9/44; G06F 9/46; G06F 13/00
(52) U.S. Cl. ...................... 719/318; 709/220; 709/223
(58) Field of Search ................................ 709/220–230, 709/313, 314, 315, 318; 719/318

(56) References Cited

U.S. PATENT DOCUMENTS

| | | | |
|---|---|---|---|
| 4,274,139 A | 6/1981 | Hodgkinson et al. | 364/200 |
| 4,404,647 A | 9/1983 | Jones et al. | 364/900 |
| 4,611,298 A | 9/1986 | Schuldt | 364/900 |
| 4,654,819 A | 3/1987 | Stiffler et al. | 364/900 |
| 4,688,221 A | 8/1987 | Nakamura et al. | 371/13 |
| 4,701,915 A | 10/1987 | Kitamura et al. | 371/13 |
| 4,942,579 A | 7/1990 | Goodlander et al. | 371/51 |
| 4,996,687 A | 2/1991 | Hess et al. | 371/10.1 |
| 5,051,887 A | 9/1991 | Berger et al. | 364/200 |
| 5,129,088 A | 7/1992 | Auslander et al. | 395/700 |
| 5,136,523 A | 8/1992 | Landers | 395/54 |
| 5,138,710 A | 8/1992 | Kruesi et al. | 395/575 |
| 5,155,845 A | 10/1992 | Beal et al. | 395/575 |
| 5,157,663 A | 10/1992 | Major et al. | 371/9.1 |
| 5,167,011 A | 11/1992 | Priest | 395/54 |
| 5,175,849 A | 12/1992 | Schneider | 395/600 |
| 5,185,884 A | 2/1993 | Martin et al. | 395/575 |

(List continued on next page.)

FOREIGN PATENT DOCUMENTS

| | | | |
|---|---|---|---|
| EP | 0 767 427 A2 | 4/1997 | G06F/9/46 |
| WO | WO 92/18931 | 10/1992 | G06F/11/20 |

OTHER PUBLICATIONS

RFC 2625—IP and ARP over Fibre Channel, M. Rajagopal, Jun./1999, ACM.*

Symmetrix 3000 and 5000 Enterprise Storage Systems Product Description Guide, EMC Corporation downloaded in Sep. 2000, from http://www.emc.com/products/product_pdfs/pdg/symm_3_5_pdg.pdf, pp. 1–32.

Robertson, Bruce, "New Products Make Replication Easier: An Analysis," Network Computing, The Gale Group, Sep. 1993, p. 99.

Lawrence, Andrew, "Remote Disks: The evolution of remote disk support over public lines means that disks can now be located thousands of kilometers away from the central processor," The Gale Group, IBM System user, vol. 14, No. 2, Feb. 1993, p. 14.

(List continued on next page.)

*Primary Examiner*—Meng-Al T. An
*Assistant Examiner*—Diem Cao

(57) ABSTRACT

A method, system, and computer program product for a data propagation platform and applications of same is described. The data propagation platform provides various storage functions. According to an embodiment, the factories of the data propagation platform create and implement device modules. Device modules perform operations on encapsulated messages formed from data and commands, such as device operation commands and data from storage device read/write operations. Device modules are formed into device chains. Device chains are able to perform various tasks as a sum of device modules. In embodiments, device chains are layered and built on each other.

15 Claims, 24 Drawing Sheets

U.S. PATENT DOCUMENTS

| | | | |
|---|---|---|---|
| 5,206,939 A | 4/1993 | Yanai et al. | 395/400 |
| 5,212,784 A | 5/1993 | Sparks | 395/575 |
| 5,212,789 A | 5/1993 | Rago | 395/600 |
| 5,235,601 A | 8/1993 | Stallmo et al. | 371/40.1 |
| 5,257,367 A | 10/1993 | Goodlander et al. | 395/600 |
| 5,263,154 A | 11/1993 | Eastridge et al. | 395/575 |
| 5,276,867 A | 1/1994 | Kenley et al. | 395/600 |
| 5,278,838 A | 1/1994 | Ng et al. | 371/10.1 |
| 5,317,731 A | 5/1994 | Dias et al. | 395/600 |
| 5,325,505 A | 6/1994 | Hoffecker et al. | 395/425 |
| 5,347,653 A | 9/1994 | Flynn et al. | 395/600 |
| 5,357,509 A | 10/1994 | Ohizumi | 371/10.1 |
| 5,367,682 A | 11/1994 | Chang | 395/700 |
| 5,375,232 A | 12/1994 | Legvold et al. | 395/575 |
| 5,390,313 A | 2/1995 | Yanai et al. | 395/425 |
| 5,404,361 A | 4/1995 | Casorso et al. | 371/40.1 |
| 5,430,866 A | 7/1995 | Lawrence et al. | 395/575 |
| 5,430,885 A | 7/1995 | Kaneko et al. | 395/800 |
| 5,432,922 A | 7/1995 | Polyzois et al. | 395/425 |
| 5,435,004 A | 7/1995 | Cox et al. | 395/575 |
| 5,452,420 A | 9/1995 | Engdahl et al. | 395/285 |
| 5,479,615 A | 12/1995 | Ishii et al. | 395/250 |
| 5,481,701 A | 1/1996 | Chambers, IV | 395/600 |
| 5,495,601 A | 2/1996 | Narang et al. | 395/600 |
| 5,497,483 A | 3/1996 | Beardsley et al. | 395/575 |
| 5,504,882 A | 4/1996 | Chai et al. | 395/182.03 |
| 5,519,844 A | 5/1996 | Stallmo | 395/441 |
| 5,522,046 A | 5/1996 | McMillen et al. | 395/200.15 |
| 5,528,759 A | 6/1996 | Moore | 395/200.11 |
| 5,530,845 A | 6/1996 | Hiatt et al. | 395/500 |
| 5,537,533 A | 7/1996 | Staheli et al. | 395/182.03 |
| 5,544,347 A | 8/1996 | Yanai et al. | 395/489 |
| 5,546,535 A | 8/1996 | Stallmo et al. | 395/182.07 |
| 5,546,556 A | 8/1996 | Matsushita | 395/427 |
| 5,561,815 A | 10/1996 | Takata et al. | 395/833 |
| 5,566,316 A | 10/1996 | Fechner et al. | 395/441 |
| 5,568,628 A | 10/1996 | Satoh et al. | 395/440 |
| 5,568,629 A | 10/1996 | Gentry et al. | 395/441 |
| 5,583,994 A | 12/1996 | Rangan | 395/200.09 |
| 5,596,736 A | 1/1997 | Kerns | 395/404 |
| 5,611,069 A | 3/1997 | Matoba | 395/441 |
| 5,619,694 A | 4/1997 | Shimazu | 395/615 |
| 5,625,818 A | 4/1997 | Zarmer et al. | 395/615 |
| 5,659,787 A | 8/1997 | Schieltz | 395/200.56 |
| 5,664,144 A | 9/1997 | Yanai et al. | 711/113 |
| 5,671,439 A | 9/1997 | Klein et al. | 395/821 |
| 5,673,322 A | 9/1997 | Pepe et al. | 380/49 |
| 5,673,382 A | 9/1997 | Cannon et al. | 395/182.04 |
| 5,680,580 A | 10/1997 | Beardsley et al. | 395/489 |
| 5,684,945 A | 11/1997 | Chen et al. | 395/182.8 |
| 5,692,155 A | 11/1997 | Iskiyan et al. | 395/489 |
| 5,710,885 A | 1/1998 | Bondi | 395/200.54 |
| 5,710,918 A | 1/1998 | Lagarde et al. | 395/610 |
| 5,715,393 A | 2/1998 | Naugle | 395/200.11 |
| 5,719,942 A | 2/1998 | Aldred et al. | 380/49 |
| 5,720,027 A | 2/1998 | Sarkozy et al. | 395/182.04 |
| 5,732,238 A | 3/1998 | Sarkozy | 395/440 |
| 5,737,743 A | 4/1998 | Ooe et al. | 711/112 |
| 5,740,397 A | 4/1998 | Levy | 395/441 |
| 5,742,792 A | 4/1998 | Yanai et al. | 395/489 |
| 5,745,789 A | 4/1998 | Kakuta | 395/841 |
| 5,748,897 A | 5/1998 | Katiyar | 395/200.49 |
| 5,761,410 A | 6/1998 | Martin et al. | 395/183.18 |
| 5,761,507 A | 6/1998 | Govett | 395/684 |
| 5,764,913 A | 6/1998 | Jancke et al. | 395/200.54 |
| 5,765,186 A | 6/1998 | Searby | 711/100 |
| 5,765,204 A | 6/1998 | Bakke et al. | 711/202 |
| 5,768,623 A | 6/1998 | Judd et al. | 395/857 |
| 5,771,367 A | 6/1998 | Beardsley et al. | 395/489 |
| 5,774,655 A | 6/1998 | Bloem et al. | 395/200.5 |
| 5,774,680 A | 6/1998 | Wanner et al. | 395/290 |
| 5,784,703 A | 7/1998 | Muraoka et al. | 711/173 |
| 5,787,304 A | 7/1998 | Hodges et al. | 395/821 |
| 5,787,459 A | 7/1998 | Stallmo et al. | 711/112 |
| 5,787,470 A | 7/1998 | DeSimone et al. | 711/124 |
| 5,787,485 A | 7/1998 | Fitzgerald, V et al. | 711/162 |
| 5,790,774 A | 8/1998 | Sarkozy | 395/182.04 |
| 5,805,919 A | 9/1998 | Anderson | 395/821 |
| 5,809,328 A | 9/1998 | Nogales et al. | 395/825 |
| 5,809,332 A | 9/1998 | Vishlitzky et al. | 395/835 |
| 5,812,754 A | 9/1998 | Lui et al. | 395/182.04 |
| 5,812,784 A | 9/1998 | Watson et al. | 395/200.57 |
| 5,819,020 A | 10/1998 | Beeler, Jr. | 395/182.03 |
| 5,828,475 A | 10/1998 | Bennett et al. | 359/139 |
| 5,828,820 A | 10/1998 | Onishi et al. | 395/182.04 |
| 5,832,088 A | 11/1998 | Nakajima et al. | 380/22 |
| 5,835,718 A | 11/1998 | Blewett | 395/200.48 |
| 5,835,764 A | 11/1998 | Platt et al. | 395/671 |
| 5,842,224 A | 11/1998 | Fenner | 711/202 |
| 5,848,251 A | 12/1998 | Lomelino et al. | 395/309 |
| 5,850,522 A | 12/1998 | Wlaschin | 395/200.45 |
| 5,852,715 A | 12/1998 | Raz et al. | 395/200.31 |
| 5,857,208 A | 1/1999 | Ofek | 707/204 |
| 5,857,213 A | 1/1999 | Benhase et al. | 711/112 |
| 5,873,125 A | 2/1999 | Kawamoto | 711/202 |
| 5,889,935 A | 3/1999 | Ofek et al. | 395/182.04 |
| 5,893,919 A | 4/1999 | Sarkozy et al. | 711/114 |
| 5,894,554 A | 4/1999 | Lowery et al. | 395/200.33 |
| 5,897,661 A | 4/1999 | Baranovsky et al. | 711/170 |
| 5,901,280 A | 5/1999 | Mizuno et al. | 395/182.04 |
| 5,901,327 A | 5/1999 | Ofek | 395/825 |
| 5,909,692 A | 6/1999 | Yanai et al. | 711/4 |
| 5,911,150 A | 6/1999 | Peterson et al. | 711/162 |
| 5,911,779 A | 6/1999 | Stallmo et al. | 714/6 |
| 6,105,122 A * | 8/2000 | Muller et al. | 709/224 |
| 6,148,349 A * | 11/2000 | Chow et al. | 710/33 |
| 6,209,023 B1 * | 3/2001 | Dimitroff et al. | 709/211 |
| 6,425,036 B2 * | 7/2002 | Hoese et al. | 710/62 |
| 6,470,382 B1 * | 10/2002 | Wang et al. | 709/220 |
| 6,470,397 B1 * | 10/2002 | Shah et al. | 709/250 |
| 6,574,696 B1 * | 6/2003 | Jerman et al. | 709/211 |
| 6,584,502 B1 * | 6/2003 | Natarajan et al. | 709/224 |
| 6,622,163 B1 * | 9/2003 | Tawill et al. | 709/211 |
| 6,640,278 B1 * | 10/2003 | Nolan et al. | 711/6 |
| 6,654,502 B1 * | 11/2003 | Aldrich et al. | 382/236 |

OTHER PUBLICATIONS

Bobrowski, Steve, "Protecting your data: Overview and Comparison of Backup and Recovery Features in Database Servers," The Gale Group, DBMS, vol. 6, No. 8, Jul., 1993, p. 55.

Patent Abstracts of Japan, Patent No. JP63010286, published Jan. 16, 1988.

Copy of International Search Report issued Aug. 27, 2001 for PCT/US00/32493, 8 pages.

Vekiarides, Nicos, "Fault–Tolerant Disk Storage and File Systems Using Reflective Memory," IEEE, Proceedings of the 28$^{th}$ annual Hawaii International Conference on System Sciences, 1995, pp. 103–113.

Vekiarides, Nicos, "Implementation of a Fault–Tolerant Disk Storage System Using Reflective Memory," date and publisher unknown, pp. 1–28.

"Program for Exporting Transmission Control Protocol––Based Services through Firewalls," IBM Corp., IBM® Technical Disclosure Bulletin, vol. 40, No. 12, Dec. 1997, pp. 161–162.

"Product Brief– May 2000: StorageApps' SAN Appliance," The Enterprise Storage Group, 2000, pp. 1–3.

"Enterprise Storage Report: Technical Review," Enterprise Storage Group, www.enterprisestoragegroup.com, vol. 6, date unknown, 5 pages.

Christensen, Brenda, "Building a Storage–Area Network: SANs Boost Performance, Reliability, and Scalability of the Critical Link Between Servers and Storage Devices," Data Communications, Apr. 21, 1998, pp. 67–71.

Jander, Mary, "Launching a Storage–Area Net: High–Speed Storage–Area Networks Help Net Managers Hurl Stored Data Around Quickly– and Take the Load off the LAN and WAN," Data Communications, Mar. 21, 1998, pp. 64–72.

Press Release, HP's High–Speed I/O Business Unit, Hewlett Packard, Aug. 1997, 3 pages.

Press Release, "HP's TACHYON Fibre Channel Controller Chosen by Compaq: Industry–Leading IC to Enable Next–Generation Storage Solutions," Hewlett Packard, Aug. 6, 1997, 2 pages.

Press Release, "HP's TACHYON Family of Fibre Channel Protocol Controllers to be Part of Compaq's Next–Generation Storage Solutions," Hewlett Packard, Dec. 7, 1998, 2 pages.

Mace, Scott, "Serving Up Storage," The McGraw–Hill Companies, Inc., BYTE, vol. 23, No. 1, Jan. 1998, p. 72.

Kennedy, Carla, "Fibre Channel Speeds the Convergence of Network and Storage," Storage Management Solutions, Nov. 1997, pp. 28–31.

Fleming, Vincent, "Raid in Clusters," Storage Management Solutions, Mar. 1998, pp. 51–53.

Smith, Brian R., "How Will Migrating To Fibre Channel Occur?" Computer Technology Review, date unknown, pp. 92, 94, 95.

Snively, Robert, "SCSI applications on Fibre Channel," High–Speed Fiber Networks and channels II, The Society of Photo–Optical Instrumentation Engineers, Proceedings SPIE– The International Society for Optical Engineering, Sep. 8–9, 1992, vol. 1784, pp. 104–113.

Copy of International Search Report issued Oct. 9, 2001 for PCT/US00/42337, 7 pages.

Bannister, Dick, "Compaq Storage Resource Manager," Evaluator Group Inc., Storage News, vol. 2, Issue 4, Apr. 2000.

* cited by examiner

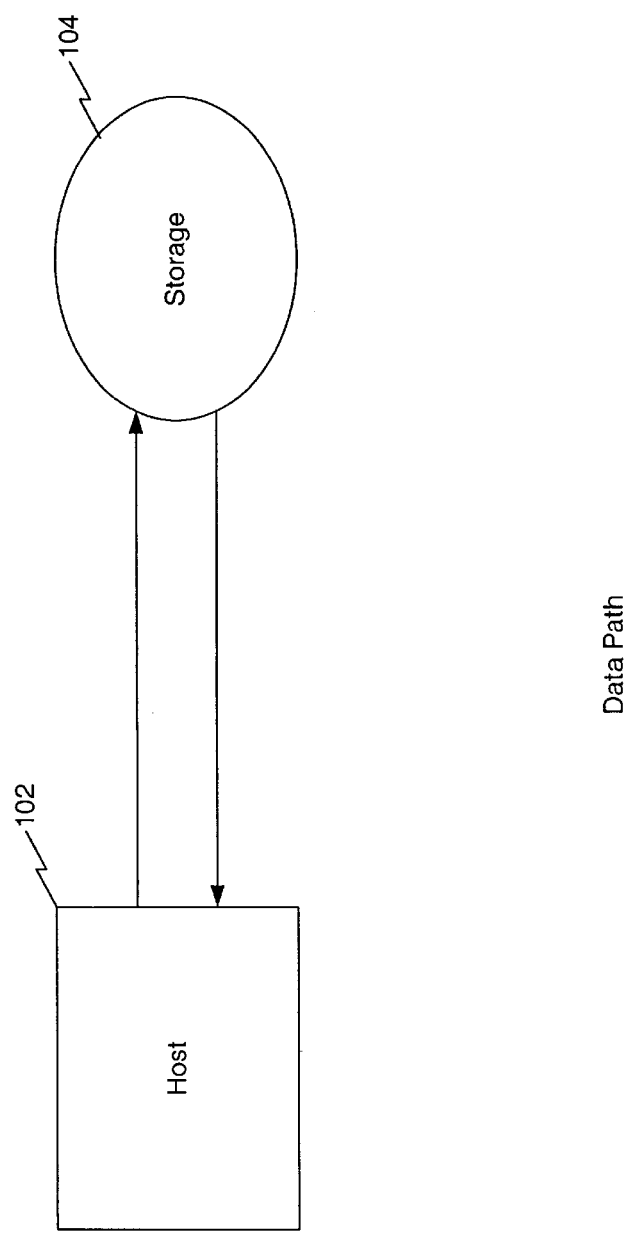

METHOD, SYSTEM, AND COMPUTER PROGRAM PRODUCT FOR A DATA PROPAGATION PLATFORM AND APPLICATIONS OF SAME

CROSS-REFERENCE TO OTHER APPLICATIONS

The following applications of common assignee are related to the present application, and are herein incorporated by reference in their entireties:

"Method and System of Allocating Storage Resources in a Storage Area Network," Ser. No. 09/664,500, Attorney Docket No. 1942.0030000, filed concurrently herewith.

"Internet Protocol Data Mirroring," Ser. No. 09/664,499, Attorney Docket No. 1942.0040000, filed concurrently herewith.

"Method, System, and Computer Program Product for Managing Storage Resources," Ser. No. 09/664,314, Attorney Docket No. 1942.0050000, filed concurrently herewith.

BACKGROUND OF THE INVENTION

1. Field of the Invention

The invention relates generally to the field of storage area networks, and more particularly to data-flow processing through a layered framework.

2. Related Art

Traditional approaches exist for data path architectures in storage networks. These approaches generally follow a stream oriented configuration for data transfer with flow control.

Stream oriented approaches typically focus on using a data path to communicate between processes. For example, a first process may write data to a data path for a second process. The second process must wait for the data to arrive from the first process. These processes must wait for the data to be pushed to them along the path. Thus, stream oriented architectures have a drawback based on their intrinsic nature.

Specifically, stream oriented architectures suffer from stability issues. If one process fails, then other processes may not receive any data. Additionally, other difficulties include: managing the paths between and among processes for each storage device, server (host) and network device; monitoring the processes so users of the various processes can be alerted to faulty processes; and managing inter-host dependencies when processes are altered because the functionality is altered.

Therefore, in view of the above, what is needed is a system, method and computer program product for a data propagation platform. Furthermore, what is needed is a system, method and computer program product for producing applications capable of being added and/or layered without changing, affecting, or disrupting the basic processing architecture. Still further, what is needed is a system, method and computer program product for a data propagation platform that provides flexibility in that processes can be instantiated as modules linked in data paths. Yet still further, what is needed is a system, method and computer program product for a data propagation platform that is capable of providing a stable architecture for data paths and processes.

SUMMARY OF THE INVENTION

The present invention is directed to a method, system, and computer program product for a data propagation platform that satisfies the above-stated needs. Device modules are constructed to form the basic elements of the data path. Device modules manipulate passing objects by processing only those objects that the device modules are designed to understand. In one embodiment, objects which are not understood are passed without modification. Objects include messages, which are encapsulated data and commands. Thus, device modules execute commands in the data path.

The present invention can be implemented in a storage area network (SAN) and operated from a SAN appliance that interfaces between the hosts and the storage subsystems of the SAN. Furthermore, the present invention can be implemented in more complex network topologies as described herein in embodiments.

Further aspects of the invention, and further features and benefits thereof, are described below. The accompanying drawings, which are incorporated herein and form a part of the specification, illustrate the invention and, together with the description, further serve to explain the principles of the invention and to enable a person skilled in the pertinent art to make and use the invention.

BRIEF DESCRIPTION OF THE FIGURES

In the drawings, like reference numbers indicate identical or fuctionally similar elements. Additionally, the left-most digit(s) of a reference number identifies the drawing in which the reference number first appears.

FIG. 1A illustrates a block diagram of an example data path, according to an embodiment of the invention;

The invention will now be described with reference to the accompanying drawings.

DETAILED DESCRIPTION OF THE PREFERRED EMBODIMENTS

Applications of a Data Propagation Platform and Embodiments

The present invention is directed to a method, system, and computer program product for a data propagation platform that provides an object oriented framework for applications. The data propagation platform or data propagation framework (hereinafter referred to as "DPF") provides flexibility in that device modules, which perform various functions, can be linked and re-linked to form different data paths. Additionally, new device modules can be linked in data paths to provide new functionality. The invention manages the creation of chains of device modules to form data paths. In an embodiment, the invention also allows for the implementation of data paths in the user space of computing environment, thereby separating the processing of the device modules from the kernel of the computing environment.

FIG. 1A illustrates a block diagram 100A of an example data path, according to an embodiment of the invention. Diagram 100A includes host 102 and storage 104. The arrow going from host 102 to storage 104 and the arrow going from storage 104 back to host 102 both illustrate a straightforward data path without the use of any network devices.

Figure 1B:
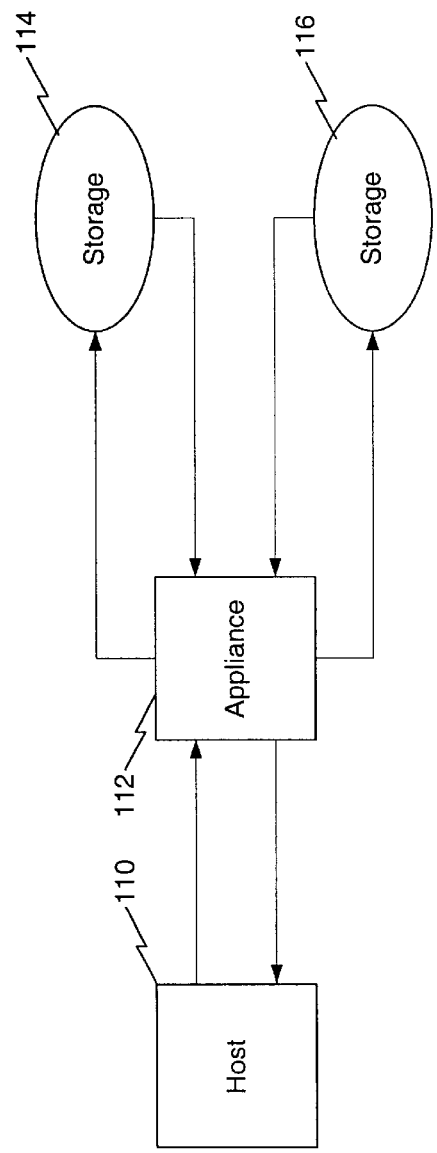
FIG. 1B illustrates a block diagram of an example mirrored data path, according to an embodiment of the invention.

FIG. 1B illustrates a block diagram 100B of an example mirrored data path, according to an embodiment of the invention. Diagram 100B includes host 110 connected to appliance 112. In turn, appliance 112 is connected to each of storage 114 and storage 116. Storage 114 or storage 116 are accessible to host 110 through appliance 112. In one embodiment, data is mirrored to both storage 114 and storage 116 in order to provide a backup of the data in the event of storage device failure.

Figure 1C:
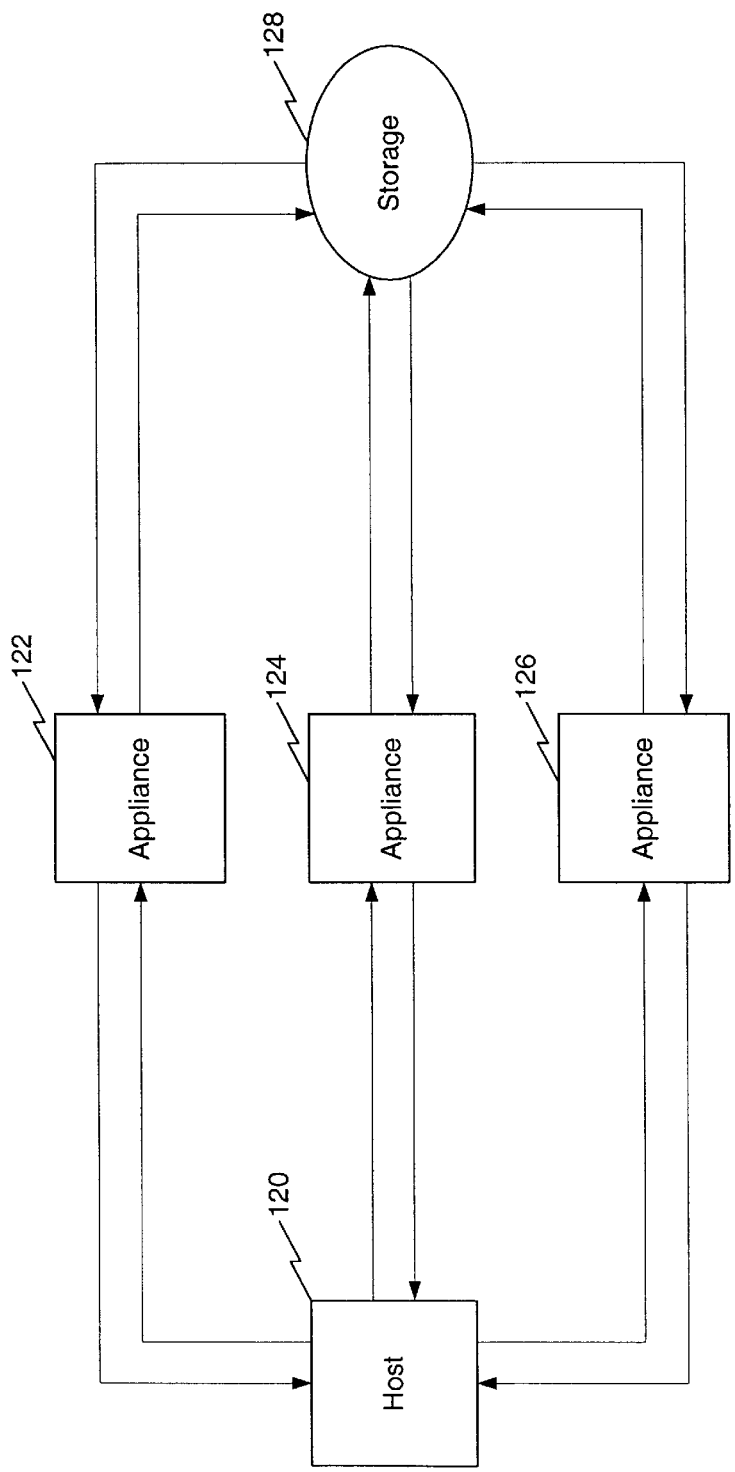
FIG. 1C illustrates a block diagram of an example redundant data path, according to an embodiment of the invention.

FIG. 1C illustrates a block diagram 100C of an example redundant data path, according to an embodiment of the invention. Diagram 100C includes host 120 connected to each of appliance 122, appliance 124, and appliance 126. Each of appliances 122–126 is connected to storage 128. In one embodiment, host 120 is able to connect to storage 128 through any of appliances 122–126. In the event of a network outage involving one or two of the appliances, host 120 can still reach storage 128 using the third appliance.

By changing the data path, one changes the way the storage operates and performs. Further combinations of the topologies of diagrams 100A, 100B, and 100C are possible as one skilled in the relevant art would recognize based on the teachings described herein. For example, each of appliances 122–126 can be connected to overlapping storage devices to provide redundancy and reliability at the appliance and storage level.

Figure 2:
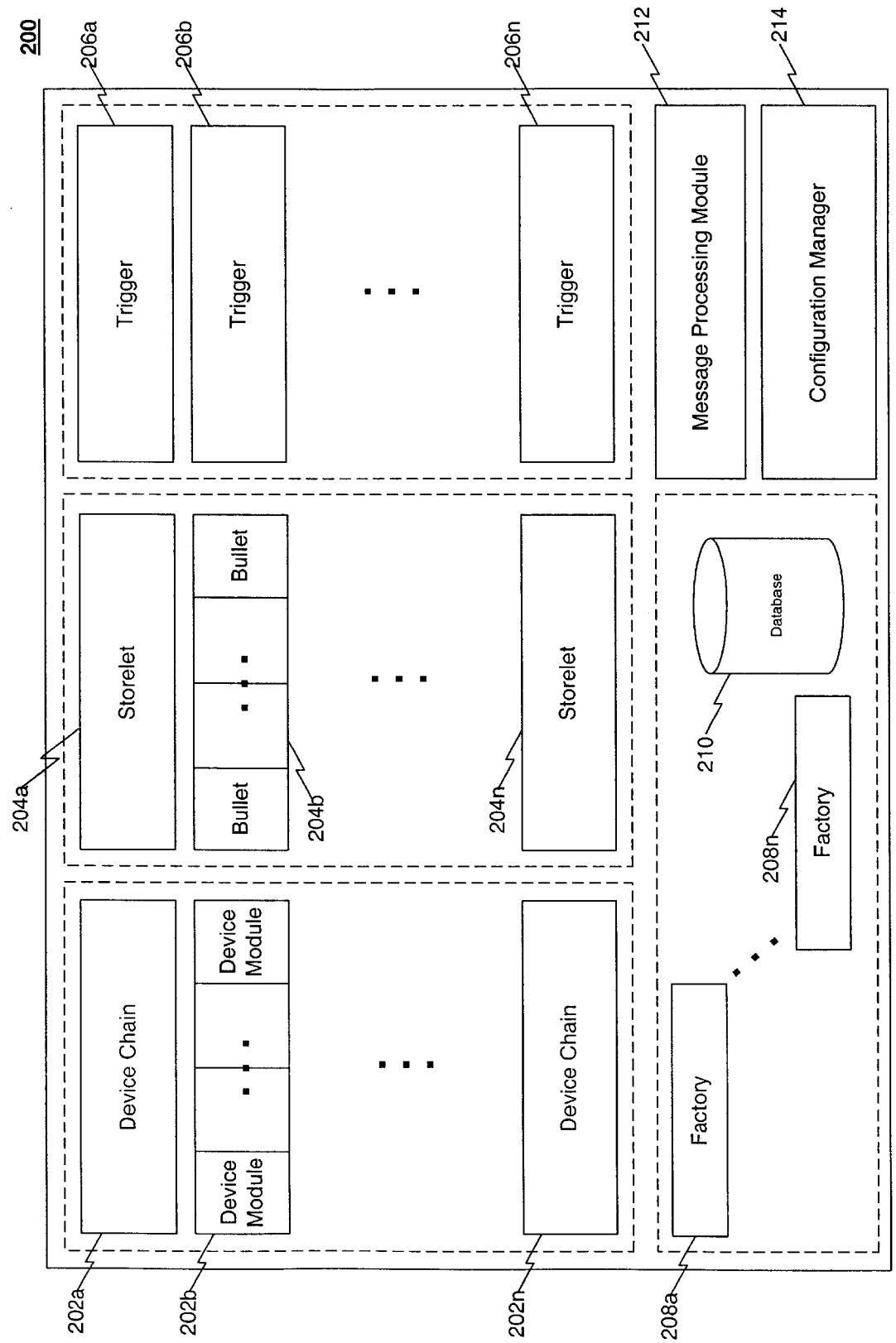
FIG. 2 illustrates a block diagram of an example system using a data propagation framework, according to an embodiment of the invention.

FIG. 2 illustrates a block diagram of an example system 200 using a data propagation framework, according to an embodiment of the invention. DPF system 200 includes device chains 202a–202n, wherein the device chains comprise device modules.

According to embodiments of the invention, device modules are objects or run-time entities constructed to perform operations on the data flowing past them in the data path. In one embodiment, a device module contains an algorithm for checking for the presence of a specific storage device, the algorithm sending a reply (or alert notice) is the device is not present. This example is not intended to limit the present invention. One skilled in the relevant art(s) would realize that, based on the teachings described herein, more complicated device modules can be constructed.

Device chains contain device modules that are linked together to form a data path. In one embodiment, the device chain is constructed as the data-past. Data and commands from devices on the network will therefore enter the device chain. Data and commands are passed along from device module to device module. Once the end of the device chain is reached, replies are passed back along the device chain by some or all of the device modules. In embodiments described below, each device module can also be viewed as a device chain, which can be linked with other chains, depending on the complexity of the operations being performed.

Device modules, which are the basic elements of the data path, manipulate passing objects by processing only those objects that they are designed to understand. In one embodiment, other objects are passed though the device chain(s) without modification. In another embodiment, other objects are time-stamped before being passed through the device chain(s). Some example device modules are listed in Table 1 below.

TABLE 1

Example Device Modules

| | |
|---|---|
| DPFCdbResizeDevice | Module for the modification of SCSI CDBs (Command Descriptor Blocks) from the 6-byte versions to the 10-byte versions, allowing expanded disk addressing |
| DPFClusterHealthDevice | Module for the monitoring of redundant pairs, allowing functionality to be shut down during failure scenarios |
| DPFContainerDevice | Module to contain other modules, with commands passing in only one direction at a time |
| DPFDeviceChain | Module to contain other modules, with commands passing both directions |
| DPFDeviceResizer | Module to modify the reported size of the Appliance virtual LUN |
| DPFEmptyDevice | Empty placeholder module, with no other purpose than to serve as a reference point |
| DPFExpanderDevice | Module to combine two underlying virtual LUNs into a single virtual LUN image |
| DPFFailoverDevice | Module to handle alternate pathing and resnchronization of data images for data replication |

TABLE 1-continued

Example Device Modules

| | |
|---|---|
| DPFForwardDevice | Module to pass all commands to a different chain |
| DPFGeometryFilter | Module to modify reported disk geometry when a virtual LUN's geometry is changed |
| DPFHealthDevice | Module to monitor the accessibility of a virtual LUN |
| DPFInquiryDevice | Module to modify the data contained in a SCSI inquiry command |
| DPFJournalDevice | Module to store location information about IO failures |
| DPFLunMasterDevice | Module to present virtual LUN "up" to the rest of the world: serves as a starting point for all IO requests |
| DPFMirrorDevice | Module to implement simple data replication between virtual LUNs |
| DPFModeSenseDevice | Module to modify SCSI mode sense commands on virtual LUNs |
| DPFMultiPartitionDevice | Module for creation of a large number of virtual partitions based on a single virtual LUN |
| DPFNTDevice | Module for communication with the back-end NT storage device |
| DPFReadAheadDevice | Module for implementing read-ahead caching |
| DPFReadOnlyDevice | Module for denying all write access to a virtual LUN |
| DPFReadWriteAccess | Module for partially restricting a particular host's access to a virtual LUN |
| DPFRedundantDevice | Module for the communication of IO information across the Fibre Channel link in a redundant Appliance pair |
| DPFRemovableDevice | Module for the simulation of a removable device on a virtual LUN |
| DPFReserveAccess | Alternative module for partially restricting a particular host's access to a virtual LUN based on the SCSI reserve/release protocol |
| DPFReserveDevice | Module for implementing the SCSI reserve/release protocol on a virtual LUN |
| DPFRPICDevice | Module for the discovery and monitoring of a primary Appliance in a redundant Appliance pair |
| DPFScsiBusDevice | Module for discovery and communication of back-end SCSI host bus adapters |
| DPFScsiForwardDevice | Module for forwarding SCSI commands to a different chain |
| DPFShareDevice | Module for sharing a single physical device between multiple virtual LUNS |
| DPFShareTarget | Module for presenting a virtual LUN based on a ShareDevice |
| DPFSnapshotSource | Module for using a virtual LUN as the source of a snapshot |
| DPFSnapshotTarget | Module for allocating a virtual LUN as a target of a snapshot |
| DPFSubLunDevice | Module for the partitioning of a single virtual LUN into multiple |
| DPFUnknownDevice | Module for handling commands directed at an unknown virtual LUN |

While the above table refers in a general manner to the operations of device modules with respect to an appliance of the present invention, the SANLink™ appliance described herein can be used.

DPF system 200 also includes storelets 204a–204n, whereby storelets include bullets. In one embodiment, storelets 204a–204n encapsulate procedural information for processing data objects. One can think of storelets as libraries (plug-ins) that contain bullets that can be attached to triggers (discussed below) either at load time or during processing. In one embodiment, storelets interact within the DPF system 200 via configuration manager 214.

In an embodiment, bullets are objects that are attached to triggers. In another embodiment, bullets contain executable code segments for processing the data provided by triggers.

Triggers 206a–206n are objects that contain data identifying the type and location of specific fields of data.

The following are some example triggers, which allow arbitrary pieces of code to attach to them and take actions based upon the messages contained within the triggers.

For example, in an embodiment, an existing storelet attaches to the SNAP_ALLOCATED, SNAP_DEALLOC, SNAP_TAKEN, and SNAP_BROKEN triggers. When a snapshot is allocated, the SNAP_ALLOCATED trigger is fired with the identifier of the disk being allocated. The attached storelet checks to see if the disk contains an NT file system, and if it does, it saves some of the metadata (data describing the NT file system) into a separate file. Then, when a snapshot is actually taken to that device, the SNAP_TAKEN trigger is fired and the storelet will restore enough of the metadata into the original device to allow NT to recognize the disk. When the snapshot is broken (no longer being used), the SNAP_BROKEN trigger is fired, and the attached storelet restores the full metadata onto the disk, preventing NT from perceiving the file system as corrupted.

In another embodiment, an existing storelet attaches to as many triggers as it can, storing the information it receives from fired triggers into an application log, which is later parsed by a different process, stored in a remote database, analyzed and possibly reported to the end user.

Storelets and triggers allow one to incrementally add new functionality without impacting the current architecture or burdening it down with platform-specific special cases.

TABLE 2

Example Triggers

| | |
|---|---|
| RESYNCH_START | Mirror resynchronization process started |
| RESYNCH_COMPLETE | Mirror resynchronization process ended |
| SNAP_ALLOCATED | Snapshot target device allocated |
| SNAP_DEALLOC | Snapshot target device deallocated |
| SNAP_TAKEN | Snapshot taken from source to target |
| SNAP_BROKEN | Snapshot to target removed |
| IO_TIMEOUT | IO request to back-end storage timed out |
| IO_FAILURE | IO request to back-end storage failed |
| DEVICE_FAILURE | IO request to back-end storage failed due to hardware error |
| DEVICE_RECOVERY | IO request to previously failed hardware succeeded |
| NODE_DOWN | Network request to remote node failed |
| NODE_TIMEOUT | Network request to remote node timed out |
| NODE_UP | Network request to previously unreachable remote node succeeded |
| FCLINK_FOUND | Fibre channel link between Appliances in a redundant pair discovered |
| FCLINK_DOWN | Fibre channel link request between Appliances in a redundant pair failed |
| FCLINK_UP | Fibre channel link request between Appliances in a redundant pair succeeded |
| GET_REPORT | Received a request for information |
| LUNMAP_ENABLED | Added a new mapping between a Appliance virtual LUN and a LUN on an attached host |
| LUNMAP_DISABLED | Removed a mapping between a Appliance virtual LUN and a LUN on an attached host |
| HOST_ADDED | New host has been attached to the Appliance |
| HOST_NAMED | Host name has been registered with the Appliance |
| HOST_REMOVED | Host name and identifier has been removed from the Appliance |
| HOST_HBA_ADDED | Known host has become visible from a new target HBA |

TABLE 2-continued

Example Triggers

| | |
|---|---|
| WAITING_FOR_BUFFER | Memory buffer pool exhausted and a thread is waiting for a buffer to be freed |
| ADDING_CONFIGURATION | A configuration change is being initiated (adding new configuration) |
| ADDED_CONFIGURATION | A configuration change was successfully made (added new configuration) |
| ADD_CONFIG_FAILED | A configuration change did not complete successfully |
| REMOVING_CONFIGURATION | A configuration change is being initiated (removing old configuration) |
| REMOVED_CONFIGURATION | A configuration change was successfully made (removed old configuration) |
| REMOVE_CONFIG_FAILED | A configuration change did not complete successfully |
| NOTIFICATION_RECEIVED | Notification of underlying system change received |
| NOTIFICATION_SCAN | Notification of underlying system configuration change received |
| DEVICE_HEALTH_UP | Appliance virtual LUN marked online |
| DEVICE_HEALTH_DOWN | Appliance virtual LUN marked offline |
| SHARE_USAGE | Shared device block usage passed notification threshold |
| SHARE_FREE | Shared device block mapping deallocated |

While the above table refers in a general manner to the triggers implemented on an appliance of the present invention, the SANLink™ appliance described herein can be used.

Factories 208a–208n operate to define device modules by maintaining a database 210 of how to enable discrete features. In one embodiment, features can be defined by a series of processing methods that can be implemented by one or more device modules and/or device chains.

Message processing module 212 receives incoming commands and data and transforms them into messages for processing. In one embodiment, message processing module 212 encapsulates commands and data in a representation for the device modules of device chains 202a–202n. Configuration manager 214 alters the operating parameters of the components of DPF system 200. In one embodiment, configuration manager 214 determines the addition, modification and removal of factories.

FIGS. 3–10 illustrate various applications developed using the components of DPF system 200.

Figure 3:
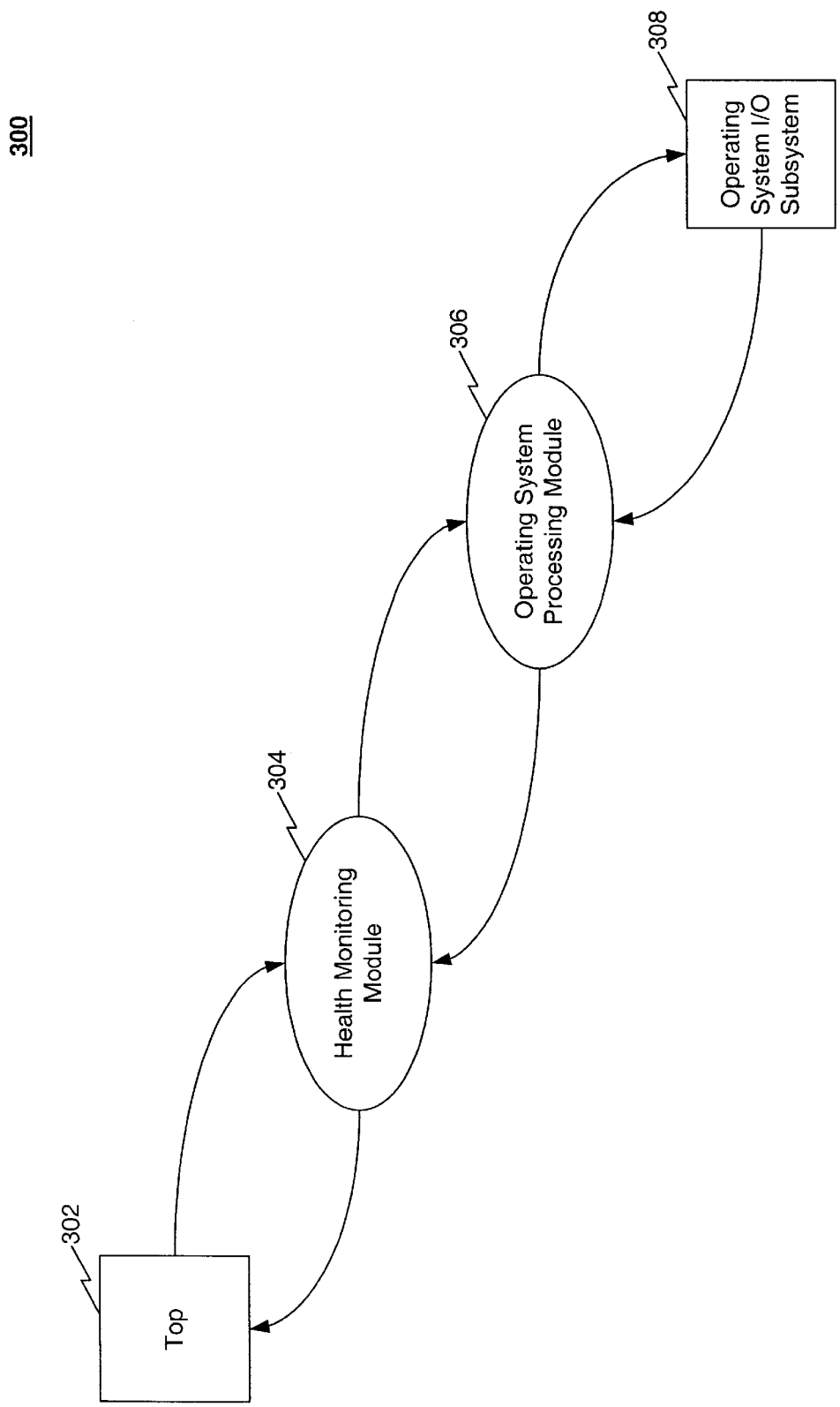
FIG. 3 illustrates a block diagram of an example device chain, according to an embodiment of the invention.

FIG. 3 illustrates a block diagram of an example device chain 300, according to an embodiment of the invention. Device chain 300 includes top 302, health monitoring module 304, operating system processing module 306, and operating system I/O subsystem 308.

Messages are received by device chain 300 at top 302. Top 302 can be linked to other device chains, and is not itself a device module. Top 302 signifies the star and end of the device chain for the purposes of illustration only. In one embodiment, top 302 includes configuration manager 214.

Health monitoring module 304 processes objects in the path that are relevant to the device module's function of monitoring the health of the devices within the system (e.g., detection of disk failure). In one embodiment, health monitoring module 304 is configured to process commands and send replies when a physical storage device goes off-line or comes on-line. In another embodiment, when a physical storage device failure occurs, the health monitoring module 304 periodically sends replies which execute health management functions that can check the storage device and maintain the integrity of the other storage devices in the system. In another embodiment, health monitoring module alerts the configuration manager 214.

Operating system processing module 306 processes operating system commands. Additional device modules can be developed and implemented.

Operating system I/O subsystem 308 provides access to the underlying functions of the operating system of the computer, PC, or other device upon which the device chain 300 is operating. Subsystem 308 is not a device module.

Figure 4:
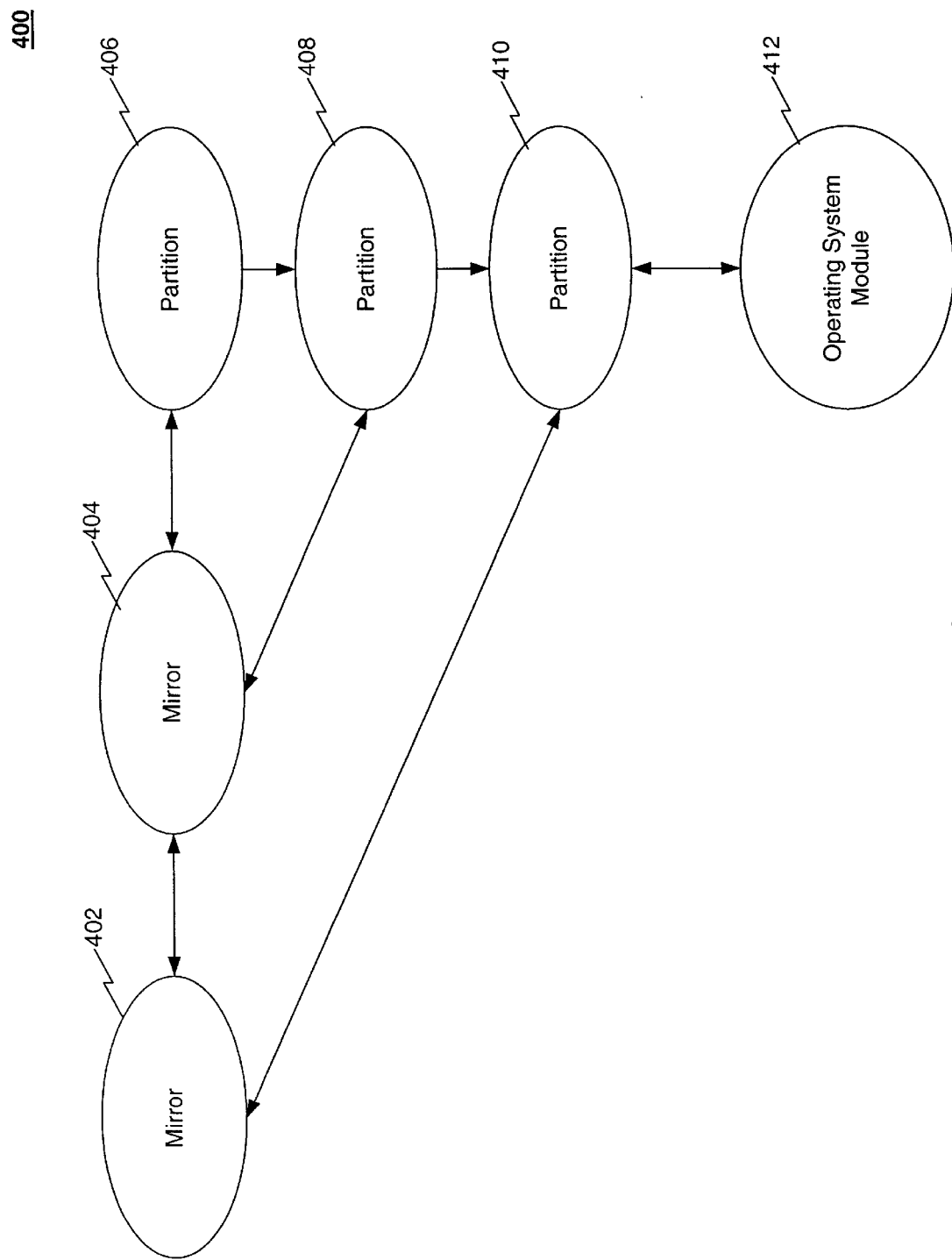
FIG. 4 illustrates a block diagram of example device chains using layering, according to an embodiment of the invention.

FIG. 4 illustrates a block diagram 400 of example device chains using layering, according to an embodiment of the invention. Diagram 400 includes mirror device chains 402 and 404. Diagram 400 also includes partition device chains 406, 408, and 410, as well as operating system device module 412.

According to embodiments of the invention, device chains can be linked to one or more other device chains (or device modules). As shown in FIG. 4, mirror chain 402 is connected to both mirror chain 404 and partition chain 410. As such, diagram 400 can be utilized to provide a layered approach to mirroring and partitioning the data passing through the DPF system 300.

The use of device chains, as described herein, to include the functionality of various storage device systems has yielded an example feature set. As one skilled in the relevant art(s) would recognize, other features can be developed according to embodiments of the present invention.

The example feature set includes fibre channel protocol (FCP) mirroring, snapshot, partitioning, and expansion. These features are discussed below with respect to FIGS. 5–9.

Figure 5:
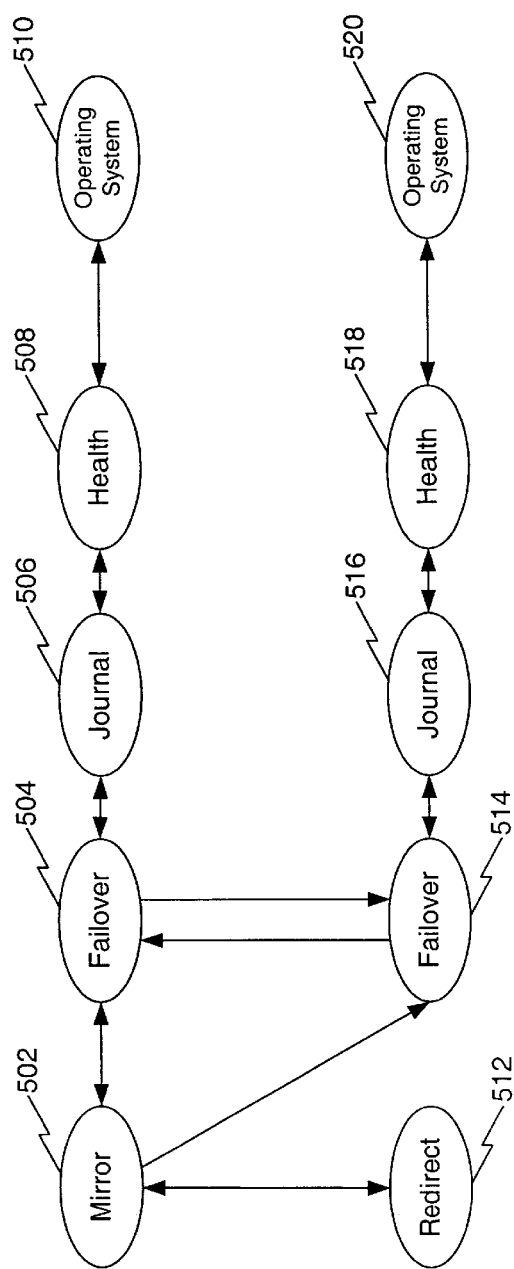
FIG. 5 illustrates a block diagram of an example of fibre channel protocol (FCP) mirroring with device chains, according to an embodiment of the invention.

FIG. 5 illustrates a block diagram of an example of FCP mirroring with device chains, according to an embodiment of the invention. As exemplified in FIG. 1B, FCP mirroring maintains a consistent image of data across two disks.

In an embodiment for normal operation, write commands are duplicated and sent down two or more paths simultaneously. In one embodiment, both commands are run completely down their device chains before a reply is passed back. This is an embodiment of synchronous operation. In a further embodiment, read commands are only passed down one path at a time.

In an embodiment involving target failure, write commands proceed normally to the source devices. The target is a physical or virtual storage device which is kept mirrored with respect to a source storage device. Additionally, write locations are stored (by journal chains 506 and 516) for later use in data recovery when the target failure has been resolved. In this embodiment, read commands are not affected.

In an embodiment involving source failure, write commands are duplicated to the target(s), according to normal operation. Write locations are stored for later use in data recovery when the source failure has been resolved. In this embodiment, read commands are redirected to the target(s).

While the embodiment discussed above involve the failure of storage components, the host is not affected by them because the DPF system 200 operates within the appliance (s) between the host and the storage devices.

Figure 6:
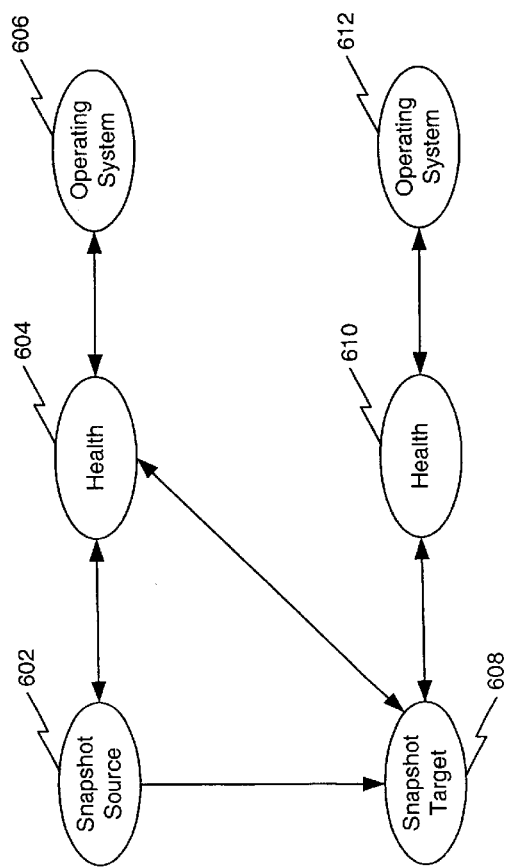
FIG. 6 illustrates a block diagram of an example of copy-on-write or snapshot with device chains, according to an embodiment of the invention.

FIG. 6 illustrates a block diagram 600 of an example of copy-on-write or snapshot with device chains, according to an embodiment of the invention. According to an embodiment of the invention, snapshots allow for simultaneous use of a storage device and a frozen image of that storage device.

Possible uses are for backup operations, application testing, and background processing of production data. Furthermore, in one embodiment, the snapshot can be used for replication of storage device. The snapshot on the target storage device can be updated from time to time or as data on the source storage device.

Figure 7:
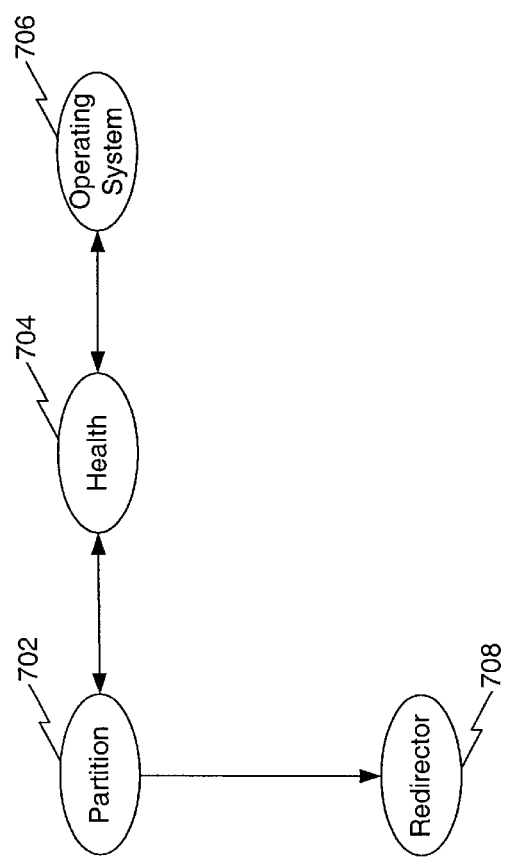
FIG. 7 illustrates a block diagram of an example single partition device chain, according to an embodiment of the invention.
Figure 8:
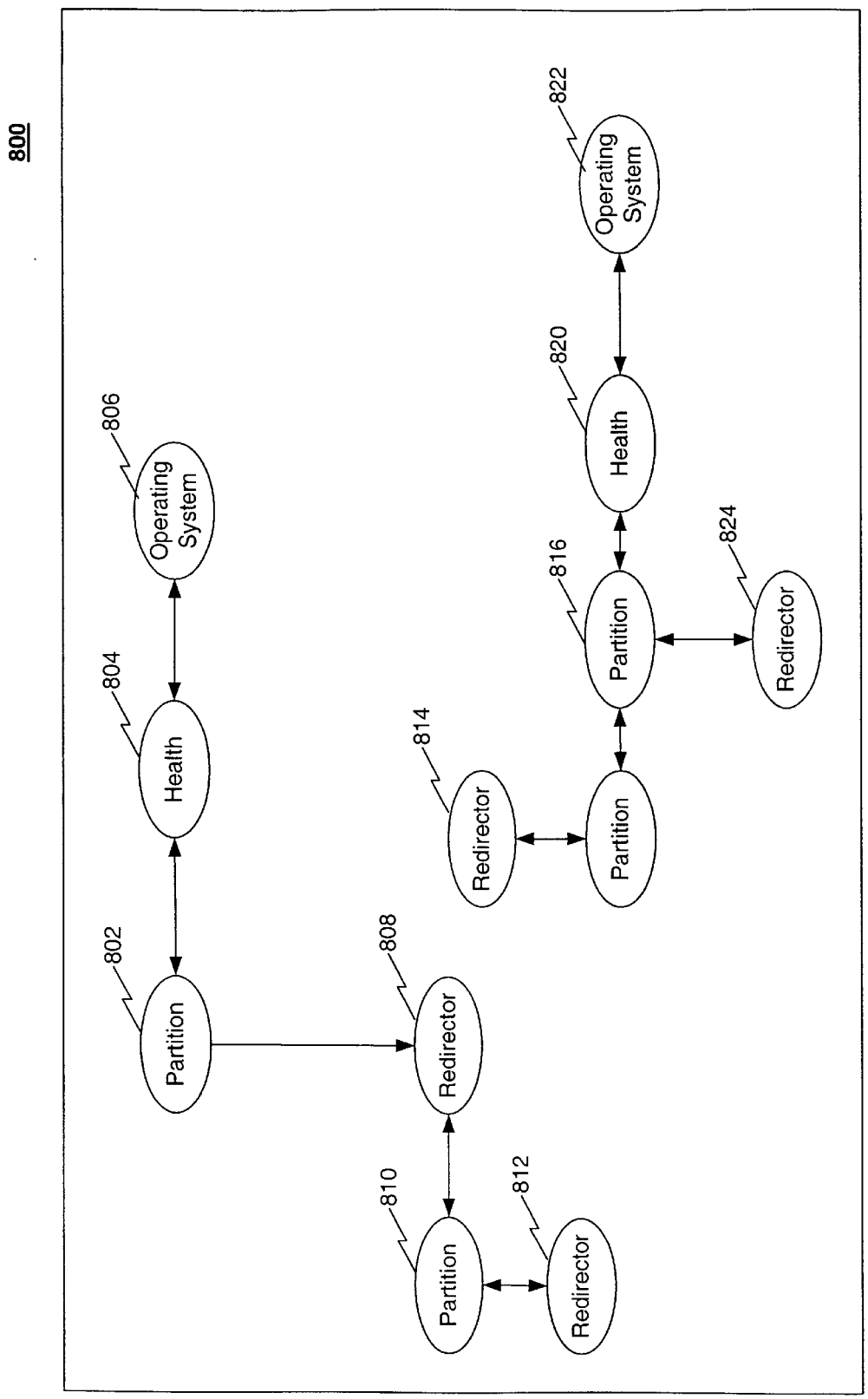
FIG. 8 illustrates a block diagram of an example multiple partition device chains, according to an embodiment of the invention.

FIG. 7 illustrates a block diagram of an example single partition device chain 700, according to an embodiment of the invention. FIG. 8 illustrates a block diagram of an example multiple partition device chains 800, according to an embodiment of the invention. In one embodiment, partitioning is used to break a single physical device into one or more smaller virtual devices. Each partition appears to hosts as an actual physical storage device. Partitioning can be used to share storage from a single storage device (or disk) across multiple host operating systems.

Figure 9:
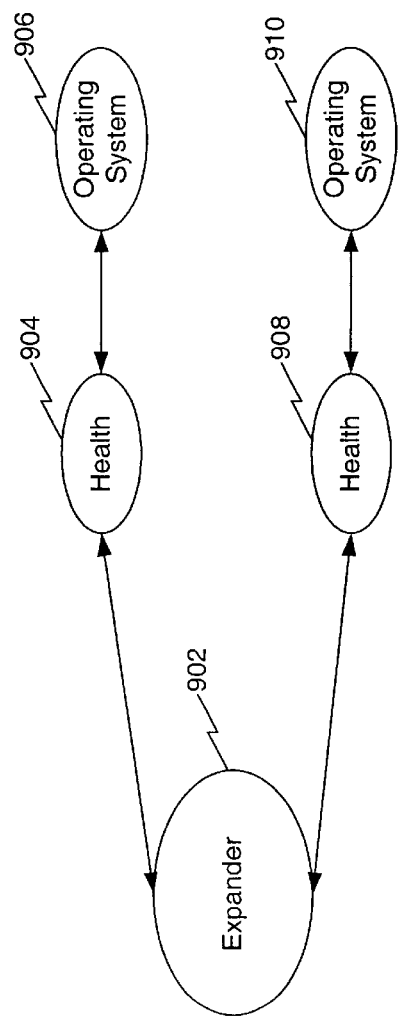
FIG. 9 illustrates a block diagram of an example expansion device chain, according to an embodiment of the invention.

FIG. 9 illustrates a block diagram of an example expansion device chain 900, according to an embodiment of the invention. In one embodiment, expansion merges two physical LUNs into a single virtual LUN. Expansion expands the appearance of the LUN to the host. In one embodiment, I/O commands are directed to either the top or bottom of the physical device, depending on the requested address.

Figure 10:
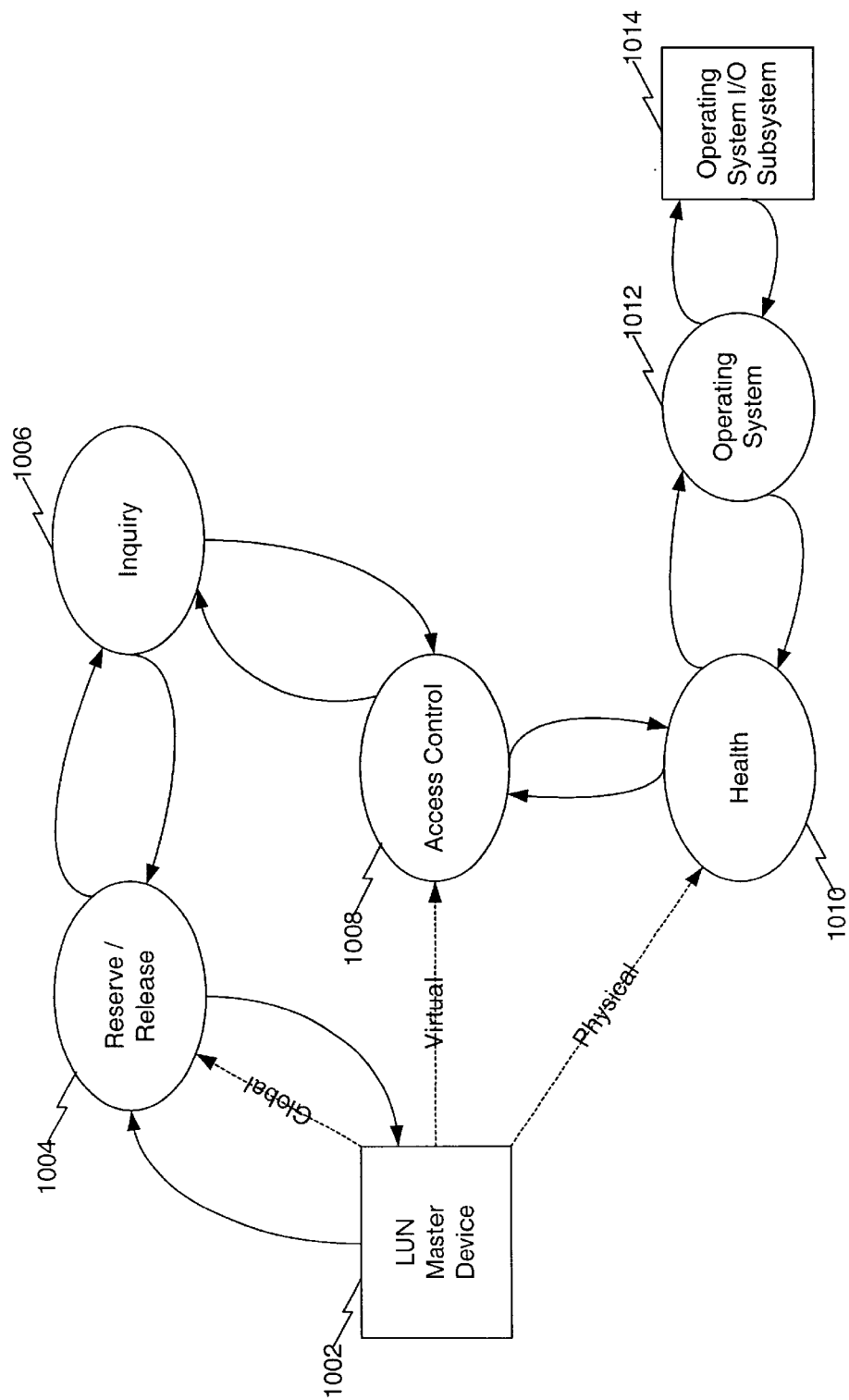
FIG. 10 illustrates a block diagram of an example of a small computer serial interface (SCSI) read command on an access-controlled logical unit number (LUN) with device chains, according to an embodiment of the invention.

FIG. 10 illustrates a block diagram 1000 of an example of a small computer serial interface (SCSI) read command on an access-controlled logical unit number (LUN) with device chains, according to an embodiment of the invention.

In this embodiment, a special form of device chain is discussed: the device container. Device containers are device chains where processing only occurs one way at a time. In the case of the stage discussed below, device containers are implemented to allow for proper processing along the multiple stages.

In an embodiment, message processing module 212 receives a SCSI command and transforms the SCSI command into a DPF command message. DPF system 200 identifies that LUN master device 1002 corresponds to the DPF command message and passes the command to device chain 1000.

In device chain 1000, LUN master device 1002 processes the message in three stages: Global SCSI processing; Virtual LUN processing; and Physical LUN processing.

In one embodiment, global SCSI processing allows that every LUN object (such as LUN master device 1002 discussed below) can have a pointer to a global container for command processing that must occur across every device, i.e., inquiries, and reserve/release functions.

According to an embodiment of the present invention, in virtual LUN level processing, every active LUN object can have a pointer to a device container for command processing that is attached to a specific LUN number, i.e., access control.

According to an embodiment of the present invention, in physical LUN level processing, every active LUN object can have a pointer to a device chain for command processing that is attached to a specific physical or underlying virtual device.

Each stage entails processing through device modules (in attached device chains) as shown in FIG. 10. When the stages have completed their processing and forwarded a reply, LUN master device 1002 forwards the reply to message processing module 212 for transformation and forwarding back to the appropriate devices.

Description in these terms is provided for convenience only. It is not intended that the invention be limited to application in this embodiment. In fact, after reading the following description, it will become apparent to a person skilled in the relevant art how to implement the invention in alternative environments known now or developed in the future. Further detailed embodiments of the elements of DPF system 200 are discussed below.

Terminology related to the present invention is described in the following subsection. Next, an example storage area network environment is described, in which the present invention may be applied. Detailed embodiments of the routines of the DPF system 200 of the present invention are presented in the following subsection, followed by exemplary graphical user interface of the storage resource manager. Finally, an exemplary computer system in which the present invention can be implemented is then described.

Terminology

To more clearly delineate the present invention, an effort is made throughout the specification to adhere to the following term definitions as consistently as possible.

| | |
|---|---|
| Arbitrated Loop | A shared 100 MBps Fibre Channel transport supporting up to 126 devices and 1 fabric attachment. |
| Fabric | One or more Fibre Channel switches in a networked topology. |
| GBIC | Gigabit interface converter; a removable transceiver module for Fibre Channel and Gigabit Ethernet physical-layer transport. |
| GLM | Gigabit link module; a semipermanent transceiver that incorporates serializing/deserializing functions. |
| HBA | Host bus adapter; an interface between a server or workstation bus and a Fibre Channel network. |
| Hub | In Fibre Channel, a wiring concentrator that collapses a loop topology into a physical star topology. |
| Initiator | On a Fibre Channel network, typically a server or a workstation that initiates transactions to disk or tape targets. |
| JBOD | Just a bunch of disks; typically configured as an Arbitrated Loop segment in a single chassis. |
| LAN | Local area network; a network linking multiple devices in a single geographical location. |
| Point-to-point | A dedicated Fibre Channel connection between two devices. |
| Private loop | A free-standing Arbitrated Loop with no fabric attachment. |
| Private loop device | An Arbitrated Loop device that does not support fabric login. |
| Public loop | An Arbitrated Loop attached to a fabric switch. |
| Public loop device | An Arbitrated Loop device that supports fabric login and device services. |
| RAID | Redundant Array of Independent Disks. |
| SCSI | Small Computer Systems Interface; both a protocol for transmitting large blocks of data and a parallel bus architecture. |
| SCSI-3 | A SCSI standard that defines transmission of SCSI protocol over serial links. |
| Storage | Any device used to store data; typically, magnetic disk media or tape. |
| Switch | A device providing full bandwidth per port and high-speed routing of data via link-level addressing. |
| Target | Typically a disk array or a tape Subsystem on a Fibre Channel network. |
| Topology | The physical or logical arrangement of devices in a networked configuration. |
| WAN | Wide area network; a network linking geographically remote sites. |

Example Storage Area Network Environment

In a preferred embodiment, the present invention is applicable to storage area networks. As discussed above, a storage area network (SAN) is a high-speed sub-network of shared storage devices. A SAN operates to provide access to the shared storage devices for all servers on a local area network (LAN), wide area network (WAN), or other network coupled to the SAN.

It is noted that SAN attached storage (SAS) elements can connect directly to the SAN, and provide file, database, block, or other types of data access services. SAS elements that provide such file access services are commonly called Network Attached Storage, or NAS devices. NAS devices can be coupled to the SAN, either directly or through their own network configuration. A SAN configuration potentially provides an entire pool of available storage to each network server, eliminating the conventional dedicated connection between server and disk. Furthermore, because a server's mass data storage requirements are fulfilled by the SAN, the server's processing power is largely conserved for the handling of applications rather than the handling of data requests.

Figure 20:
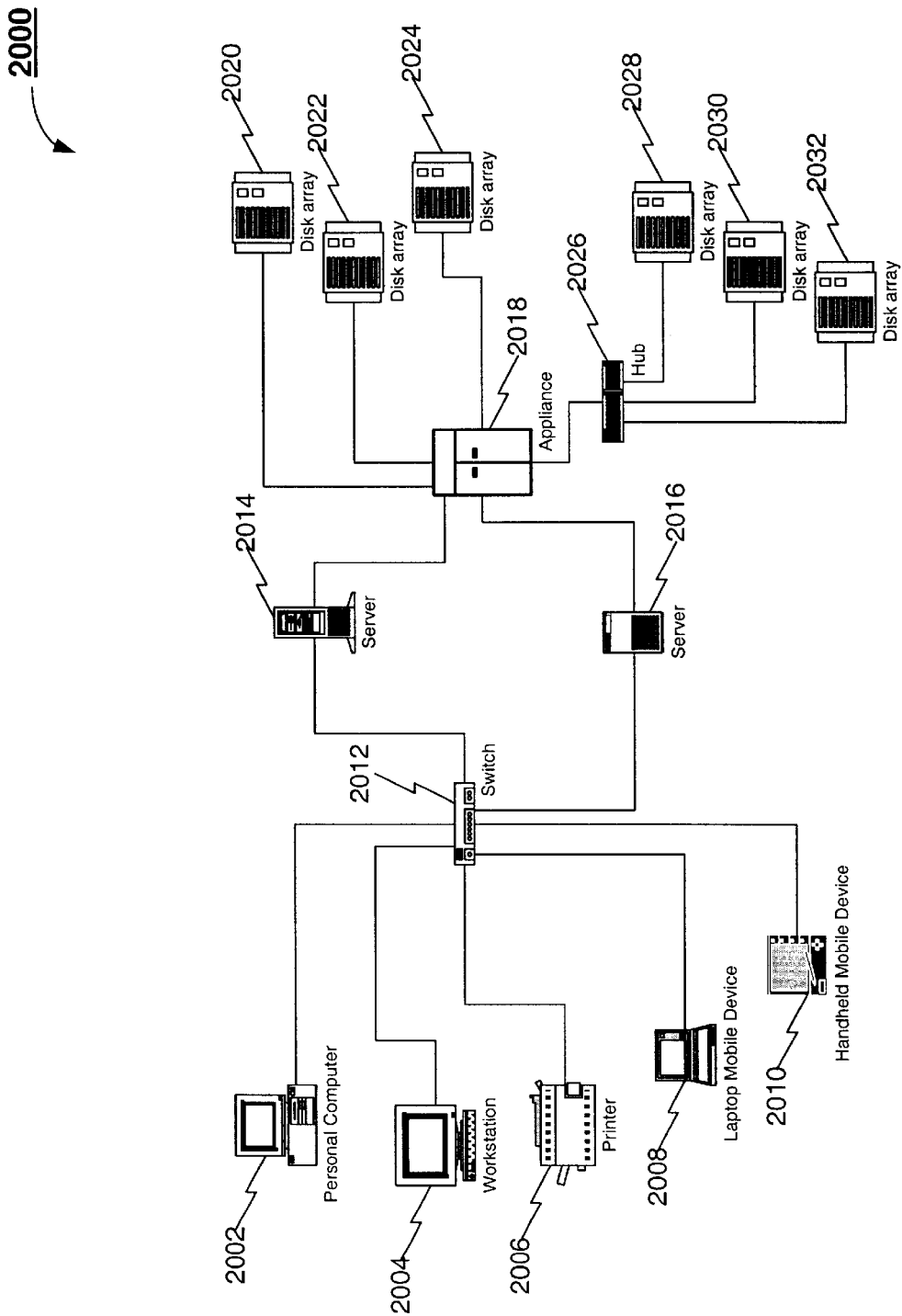
FIG. 20 illustrates an example data communication network, according to an embodiment of the invention.

FIG. 20 illustrates an example data communication network 2000, according to an embodiment of the present invention. Network 2000 includes a variety of devices which support communication between many different entities, including businesses, universities, individuals, government, and financial institutions. As shown in FIG. 20, a communication network, or combination of networks, interconnects the elements of network 2000. Network 2000 supports many different types of communication links implemented in a variety of architectures.

Network 2000 may be considered to be an example of a storage area network that is applicable to the present invention. Network 2000 comprises a pool of storage devices, including disk arrays 2020, 2022, 2024, 2028, 2030, and 2032. Network 2000 provides access to this pool of storage devices to hosts/servers comprised by or coupled to network 2000. Network 2000 may be configured as point-to-point, arbitrated loop, or fabric topologies, or combinations thereof.

Network 2000 comprises a switch 2012. Switches, such as switch 2012, typically filter and forward packets between LAN segments. Switch 2012 may be an Ethernet switch, fast-Ethernet switch, or another type of switching device known to persons skilled in the relevant art(s). In other examples, switch 2012 may be replaced by a router or a hub. A router generally moves data from one local segment to another, and to the telecommunications carrier, such as AT&T, Inc. or WorldCom, Inc., for remote sites. A hub is a common connection point for devices in a network. Suitable hubs include passive hubs, intelligent hubs, and switching hubs, and other hub types known to persons skilled in the relevant art(s).

Various types of terminal equipment and devices may interface with network 2000. For example, a personal computer 2002, a workstation 2004, a printer 2006, a laptop mobile device 2008, and a handheld mobile device 2010 interface with network 2000 via switch 2012. Further types of terminal equipment and devices that may interface with network 2000 may include local area network (LAN) connections (e.g., other switches, routers, or hubs), personal computers with modems, content servers of multi-media, audio, video, and other information, pocket organizers, Personal Data Assistants (PDAs), cellular phones, Wireless Application Protocol (WAP) phones, and set-top boxes. These and additional types of terminal equipment and devices, and ways to interface them with network 2000, will be known by persons skilled in the relevant art(s) from the teachings herein.

Network 2000 includes one or more hosts or servers. For example, network 2000 comprises server 2014 and server 2016. Servers 2014 and 2016 provide devices 2002, 2004, 2006, 2008, and 2010 with network resources via switch 2012. Servers 2014 and 2016 are typically computer systems that process end-user requests for data and/or applications. In one example configuration, servers 2014 and 2016 provide redundant services. In another example configuration, server 2014 and server 2016 provide different services and thus share the processing load needed to serve the requirements of devices 2002, 2004, 2006, 2008, and 2010. In further example configurations, one or both of servers 2014 and 2016 are connected to the Internet, and thus server 2014 and/or server 2016 may provide Internet access to network 2000. One or both of servers 2014 and 2016 may be Windows NT servers or UNIX servers, or other servers known to persons skilled in the relevant art(s).

In FIG. 20, appliance 2018 is connected to servers 2014 and 2016, and to disk arrays 2020, 2022, and 2024. Preferably, appliance 2018 has a fibre channel switch or other high-speed device used to allow servers 2014 and 2016 access to data stored on connected storage devices, such as disk arrays 2020, 2022, and 2024. Further fibre channel switches may be cascaded with appliance 2018 to allow for the expansion of the SAN, with additional storage devices, servers, and other devices. As shown in example network 2000 of FIG. 20, appliance 2018 is also connected to a hub 2026.

Hub 2026 is connected to disk arrays 2028, 2030, and 2032. Preferably, hub 2026 is a fibre channel hub or other device used to allow servers 2014 and 2016 access to data stored on connected storage devices, such as disk arrays 2028, 2030, and 2032. Further fibre channel hubs may be cascaded with hub 2026 to allow for expansion of the SAN, with additional storage devices, servers, and other devices. In an example configuration for network 2000, hub 2026 is an arbitrated loop hub. In such an example, disk arrays 2028, 2030, and 2032 are organized in a ring or loop topology, which is collapsed into a physical star configuration by hub 2026. Hub 2026 allows the loop to circumvent a disabled or disconnected device while maintaining operation.

Disk arrays 2020, 2022, 2024, 2028, 2030, and 2032 are storage devices providing data and application resources to servers 2014 and 2016 through appliance 2018 and hub 2026. As shown in FIG. 20, the storage of network 2000 is principally accessed by servers 2014 and 2016 through appliance 2018. The storage devices may be fibre channel-ready devices, or SCSI (Small Computer Systems Interface) compatible devices. Fibre channel-to-SCSI bridges may be used to allow SCSI devices to interface with fibre channel hubs and switches, and other fibre channel-ready devices. One or more of disk arrays 2020, 2022, 2024, 2028, 2030, and 2032 may instead be alternative types of storage devices, including tape systems, JBODs (Just a Bunch Of Disks), floppy disk drives, optical disk drives, and other related storage drive types.

The topology or architecture of network 2000 will depend on the requirements of the particular application, and on the advantages offered by the chosen topology. One or more hubs 2026 and/or one or more appliances 2018 may be interconnected in any number of combinations to increase network capacity. Disk arrays 2020, 2022, 2024, 2028, 2030, and 2032, or fewer or more disk arrays as required, may be coupled to network 2000 via these hubs 2026 and appliances 2018.

The SAN appliance or device as described elsewhere herein may be inserted into network 2000, according to embodiments of the present invention. For example, appliance 2018 may be augmented by other SAN appliances to provide improved connectivity between the storage device networking (disk arrays 2020, 2022, 2024, 2028, 2030, and 2032), the user devices (elements 2002, 2004, 2006, 2008, and 2010) and servers 2014 and 2016, and to provide the additional functionality of the appliance 2018 of the present invention described elsewhere herein.

Figure 21:
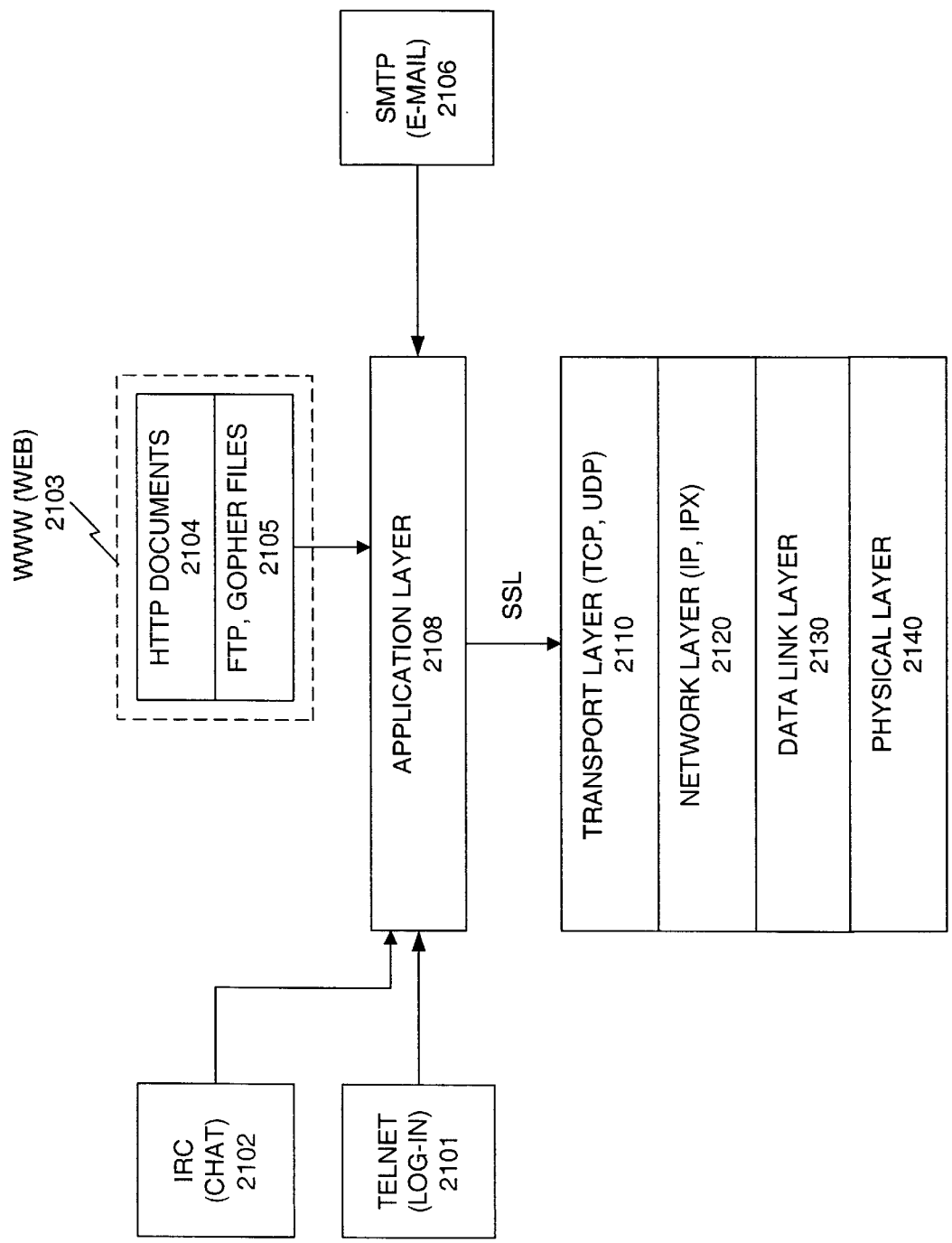
FIG. 21 shows a simplified five-layered communication model, based on an Open System Interconnection (OSI) reference model.

Communication over a communication network, such as shown in network 2000 of FIG. 20, is carried out through different layers. FIG. 21 shows a simplified five-layered communication model, based on Open System Interconnection (OSI) reference model. As shown in FIG. 21, this model includes an application layer 2108, a transport layer 2110, a network layer 2120, a data link layer 2130, and a physical layer 2140. As would be apparent to persons skilled in the relevant art(s), any number of different layers and network protocols may be used as required by a particular application.

Application layer 2108 provides functionality for the different tools and information services which are used to access information over the communications network. Example tools used to access information over a network include, but are not limited to Telnet log-in service 2101, IRC 2102, Web service 2103, and SMTP (Simple Mail Transfer Protocol) electronic mail service 2106. Web service 2103 allows access to HTTP documents 2104, and FTP (File Transfer Protocol) and Gopher files 2105. Secure Socket Layer (SSL) is an optional protocol used to encrypt communications between a Web browser and Web server.

Transport layer 2110 provides transmission control functionality using protocols, such as TCP, UDP, SPX, and others, that add information for acknowledgments that blocks of the file had been received.

Network layer 2120 provides routing functionality by adding network addressing information using protocols such as IP, IPX, and others, that enable data transfer over the network.

Data link layer 2130 provides information about the type of media on which the data was originated, such as Ethernet, token ring, or fiber distributed data interface (FDDI), and others.

Physical layer 2140 provides encoding to place the data on the physical transport, such as twisted pair wire, copper wire, fiber optic cable, coaxial cable, and others.

Description of this example environment in these terms is provided for convenience only. It is not intended that the invention be limited to application in this example environment. In fact, after reading the description herein, it will become apparent to persons skilled in the relevant art(s) how to implement the invention in alternative environments. Further details on designing, configuring, and operating storage area networks are provided in Tom Clark, "Designing Storage Area Networks: A Practical Reference for Implementing Fibre Channel SANs" (1999), which is incorporated herein by reference in its entirety.

Data Propagation Platform Embodiments

The method for the storage resource manager of the present invention are described in more detail. These method embodiments are routines that are described herein for illustrative purposes, and are not limiting. In particular, the present invention as described herein can be achieved using many orderings of the steps described herein.

Furthermore, the method of the present invention as described herein can be implemented in a computer system, application-specific box, or other device. In an embodiment, the present invention may be implemented in a SAN appliance, which provides for an interface between host servers and storage. Such SAN appliances include the SAN-Link™ appliance, developed by StorageApps Inc., located in Bridgewater, N.J.

Figure 11:
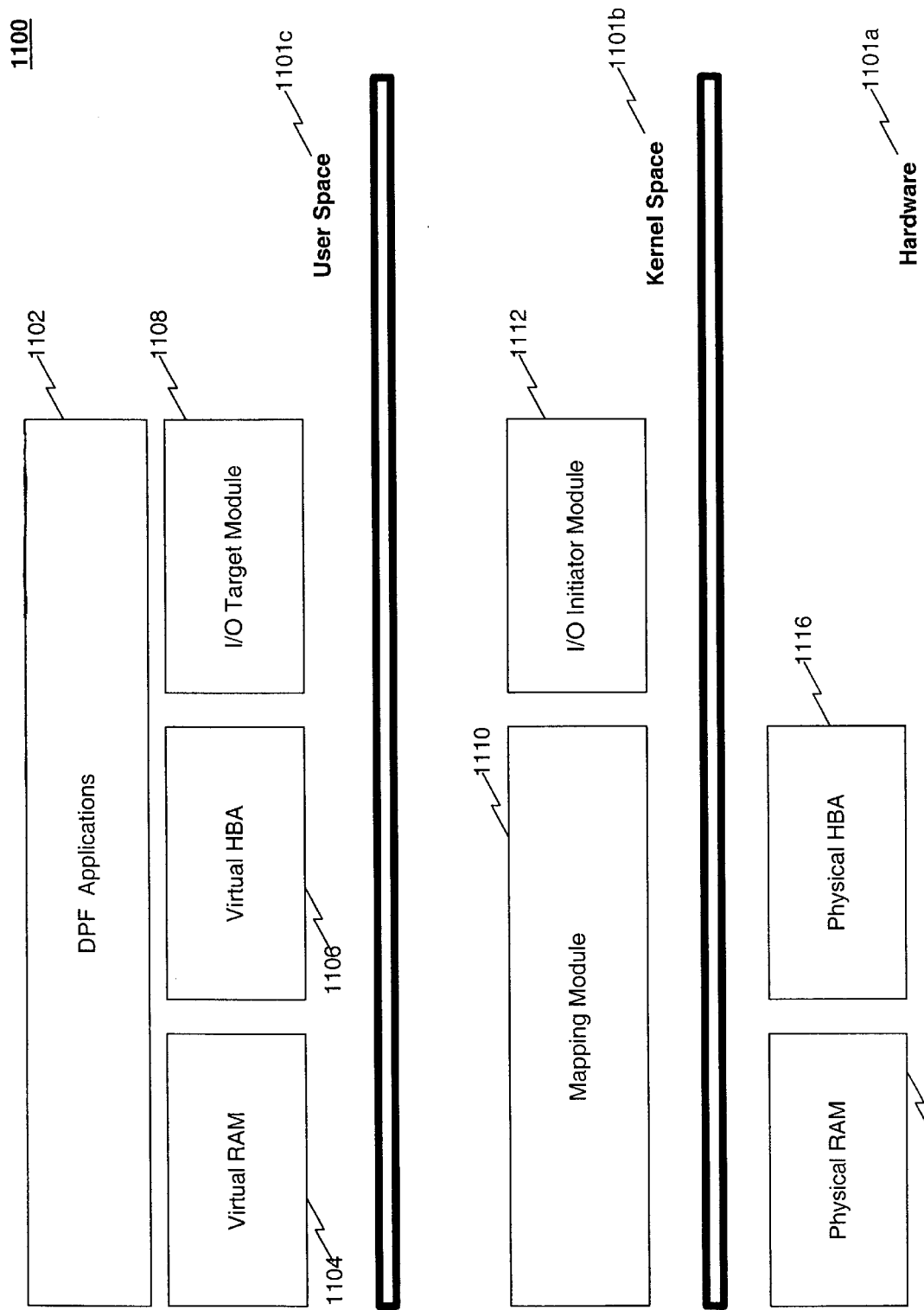
FIG. 11 illustrates an example operating environment, according to an embodiment of the invention.

FIG. 11 illustrates an example operating environment 1100, according to an embodiment of the invention. Operating environment 1100 shows the basic components for conducting data-flow operations in user space, as opposed to the underlying kernel space. Through mapping, the present invention can bypass the kernel space, thereby reducing exposure to kernel related errors.

Operating environment 1100 includes a hardwear layer 1101a, a kernel space 1101b, and a user space 1101c. Hardware layer 1101a includes physical random access memory (RAM) 1114 and physical host bus adapter HBA 1116. Kernel space 1101b includes mapping module 1110 and O/I initiator module 1112. User space 1101c includes DPF applications 1102, virtual RAM 1104, virtual HBA 1106, and I/O target module 1108.

In one embodiment, mapping module 1110 allocates physical RAM 1114 on the target HBA to run a SCSI target driver as an application. In other words, mapping module 1110 maps physical memory into user space for target driver buffer queries that handle SCSI commands. This allows direct access to the physical HBA 1116 without using the kernel space.

Figure 12:
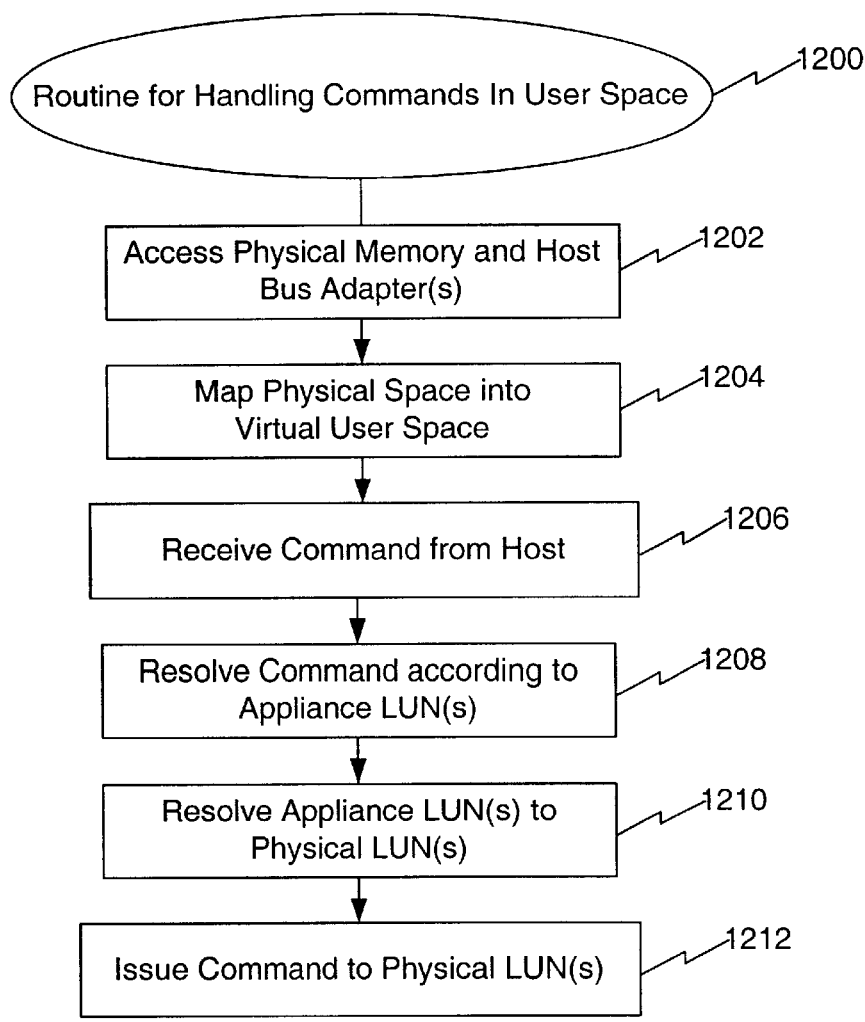
FIG. 12 shows a flowchart providing detailed operational steps for handling commands in user space, according to an embodiment of the invention.

Referring to FIG. 12, a flowchart, providing detailed operational steps for handling commands in user space according to an embodiment of the invention, is shown.

In step 1202, mapping module 1110 accesses physical memory 1114 within physical HBA 1116. In one embodiment, more than one physical HBA is accessed for memory allocation.

In step 1204, mapping module 1110 maps physical memory in virtual RAM 1104.

In step 1206, mapping module 1110 receives a command from a host. In one embodiment, a command is received from DPF applications 1102. In yet another embodiment, a command is received from I/O initiator module 1112.

In step 1208, I/O target module 1108 resolves the command according to an appliance LUN. In one embodiment, the I/O target module 1108 resolves the command according to configuration information available from DPF applications 1102.

In step 1210, I/O target module 1108 resolves an appliance LUN to a physical LUN.

In step 1212, mapping module 1110 issues a command to the physical LUN resolved in step 1210.

Figure 13:
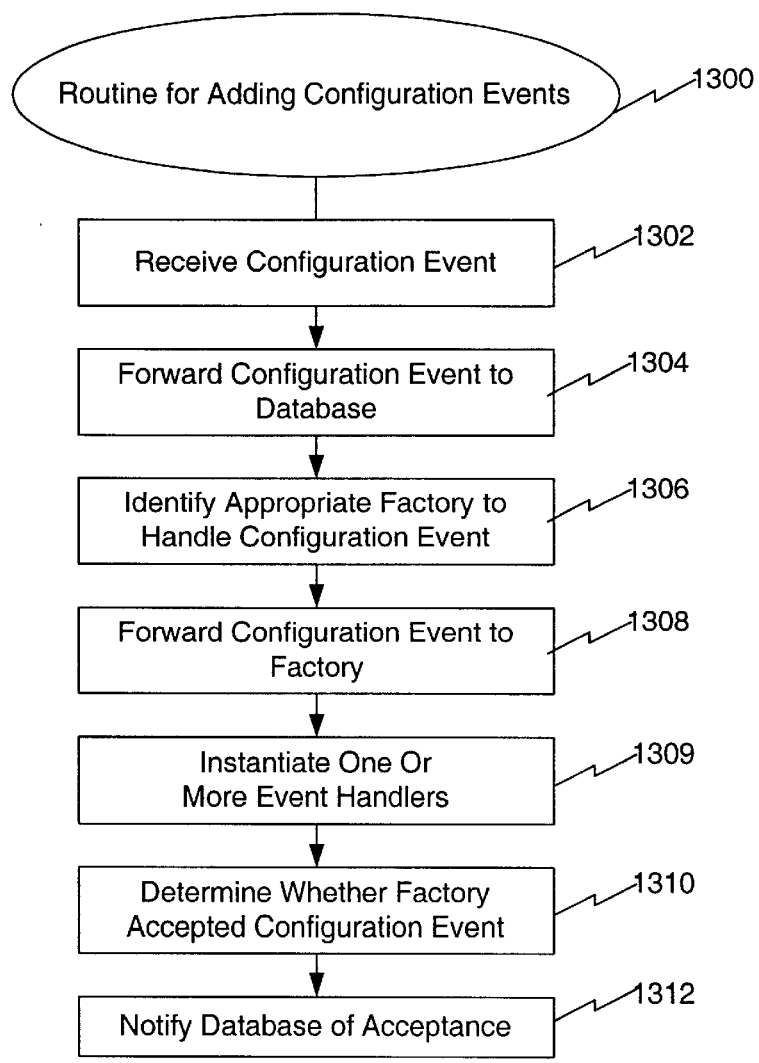
FIG. 13 shows a flowchart providing detailed operational steps for adding configuration events, according to an embodiment of the invention.

Referring to FIG. 13, a flowchart, providing detailed operational steps for adding configuration events according to an embodiment of the invention, is shown.

In step 1302, configuration manager 214 receives a configuration event.

In step 1304, configuration manager 214 forwards the configuration event to database 210.

In step 1306, DPF system 200 identifies the appropriate factory to handle the configuration event.

In step 1308, DPF system 200 forwards the configuration event to the factory.

In step 1309, DPF system 200 instantiates one or more event handlers.

In step 1310, DPF system 200 determines whether the factory accepted the configuration event.

In step 1312, DPF system 200 notifies database 210 of the acceptance.

Figure 14:
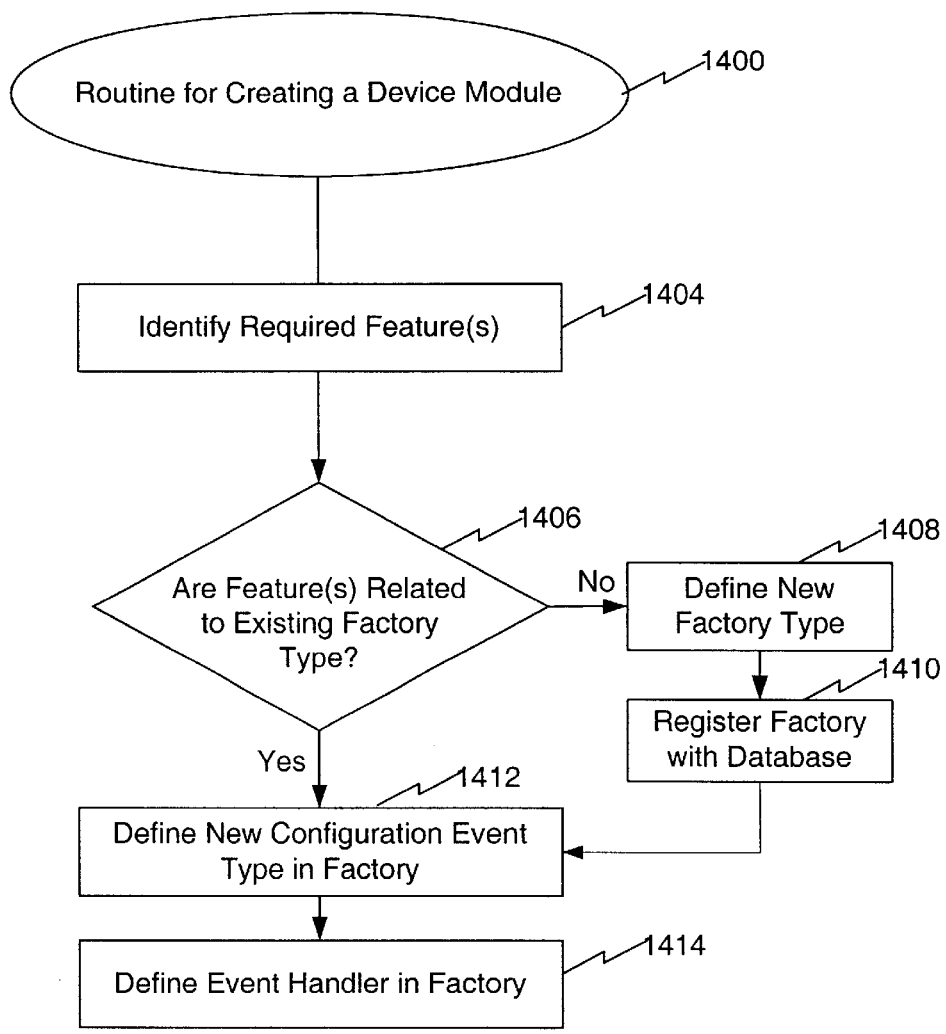
FIG. 14 shows a flowchart providing detailed operational steps for creating a device module, according to an embodiment of the invention.

Referring to FIG. 14, a flowchart, providing detailed operational steps for creating a device module, according to an embodiment of the invention, is shown.

In step 1404, DPF system 200 identifies required features for creating a device module.

In step 1406, DPF system 200 queries whether the features are related to an existing factory.

If not, then in step 1408, DPF system 200 defines a new factory type.

In step 1410; DPF system 200 registers the new factory with database 210.

If yes in step 1406, or from step 1410, in step 1412, DPF system 200 defines the new configuration event type in the factory, such that the new device module may be replicated more readily in the future.

In step 1414, DPF system 200 defines an event handler in the factory.

In one embodiment, after the steps of routine 1400, DPF system 200 adds a new device module to the correct location in a device chain.

Figure 15:
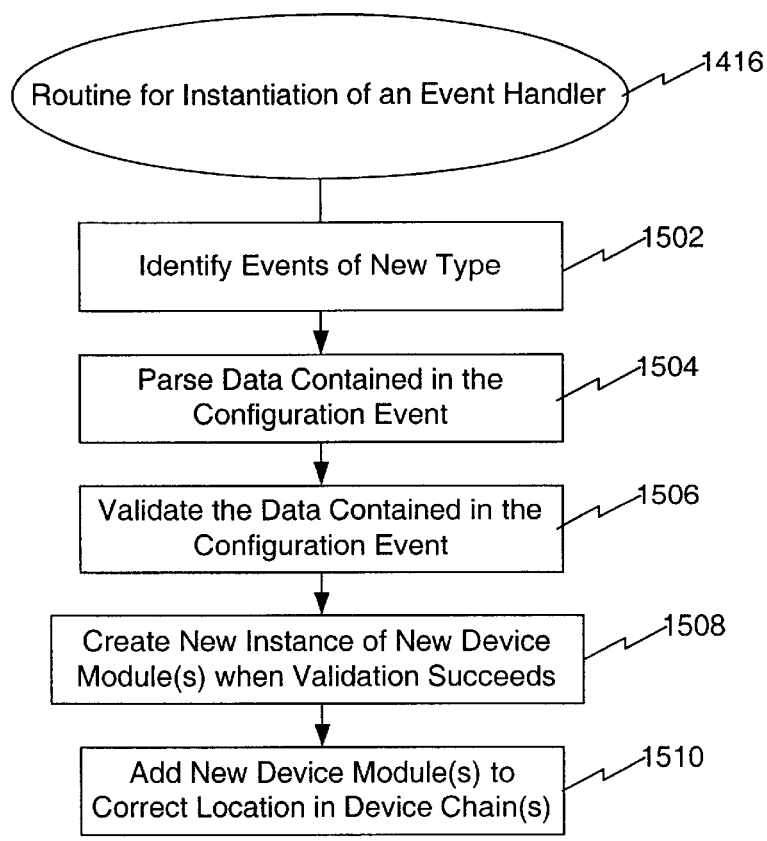
FIG. 15 shows a flowchart providing detailed operational steps for instantiating an event handler, according to an embodiment of the invention.

Referring to FIG. 15, a flowchart, providing detailed operational steps for instantiating an event handler, according to an embodiment of the invention, is shown.

In step 1502, factory 208 identifies the configuration events of the new type.

In step 1504, factory 208 parses data contained in the configuration event forwarded by configuration manager 214.

In step 1506, factory 208 validates the data contained in the configuration event.

In step 1508, when validation is successful, factory 208 creates a new instance of the new device module.

In step 1510, factory 208 adds a new device module to the correct location in a device chain.

Figure 16:
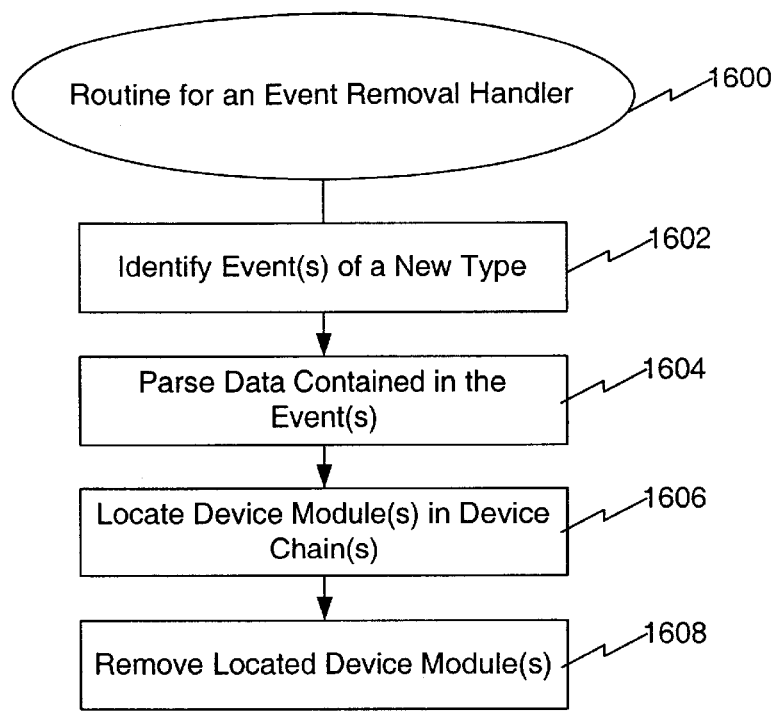
FIG. 16 shows a flowchart providing detailed operational steps of an event removal handler, according to an embodiment of the invention.

Referring to FIG. 16, a flowchart, providing detailed operational steps of an event removal handler, according to an embodiment of the invention, is shown.

In step 1602, factory 208 identifies configuration event(s) of a new type.

In step 1604, factory 208 parses data contained in the configuration events.

In step 1606, factory 208 locates the device modules in the device chains.

In step 1608, factory 208 removes the located device modules.

Figure 17:
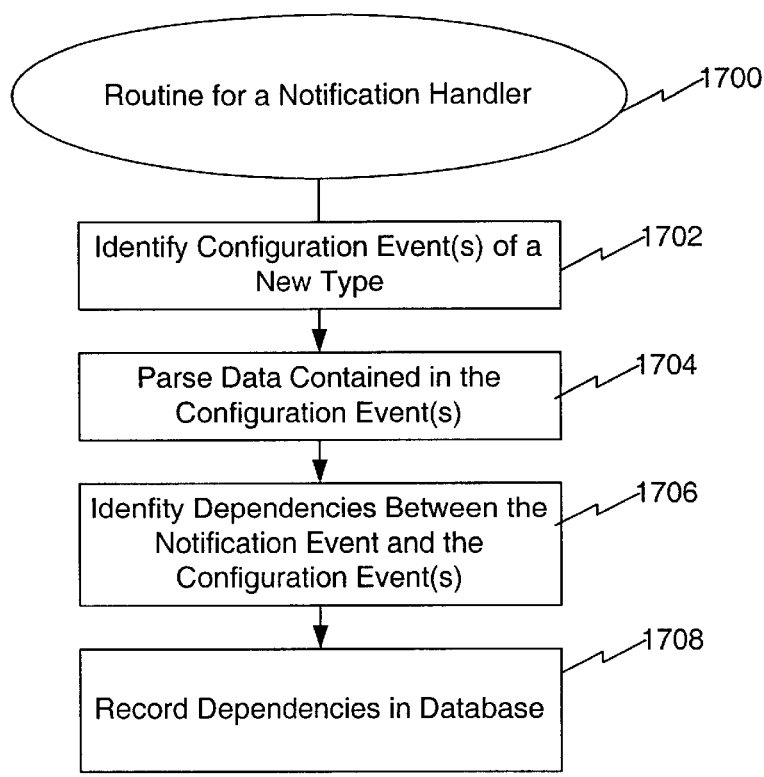
FIG. 17 shows a flowchart providing detailed operational steps of a notification handler, according to an embodiment of the invention.

Referring to FIG. 17, a flowchart, providing detailed operational steps of a notification handler, according to an embodiment of the invention, is shown.

In step 1702, factory 208 identifies configuration event(s) of a new type.

In step 1704, factory 208 parses data contained in the configuration events.

In step 1706, factory 208 identifies dependencies between the notification event and the configuration event(s).

In step 1708, factory 208 records the dependencies in database 210.

Figure 18:
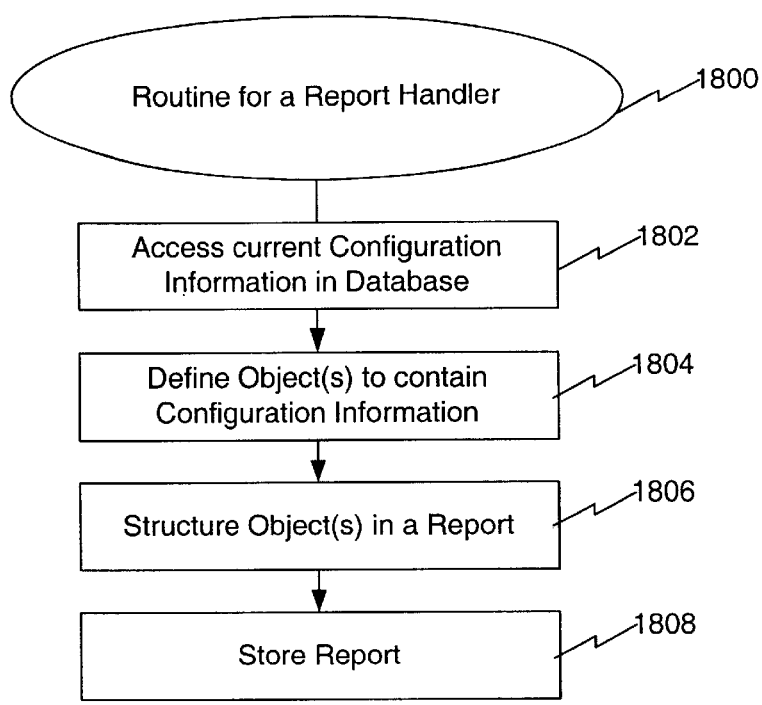
FIG. 18 shows a flowchart providing detailed operational steps of a report handler, according to an embodiment of the invention.

Referring to FIG. 18, a flowchart, providing detailed operational steps of a report handler, according to an embodiment of the invention, is shown.

In step 1802, factory 208 accesses current configuration information in database 210.

In step 1804, factory 208 defines object(s) to contain configuration information.

In step 1806, factory 208 structures the object(s) in a report.

In step 1808, factory 208 stores the report in database 210.

Figure 19:
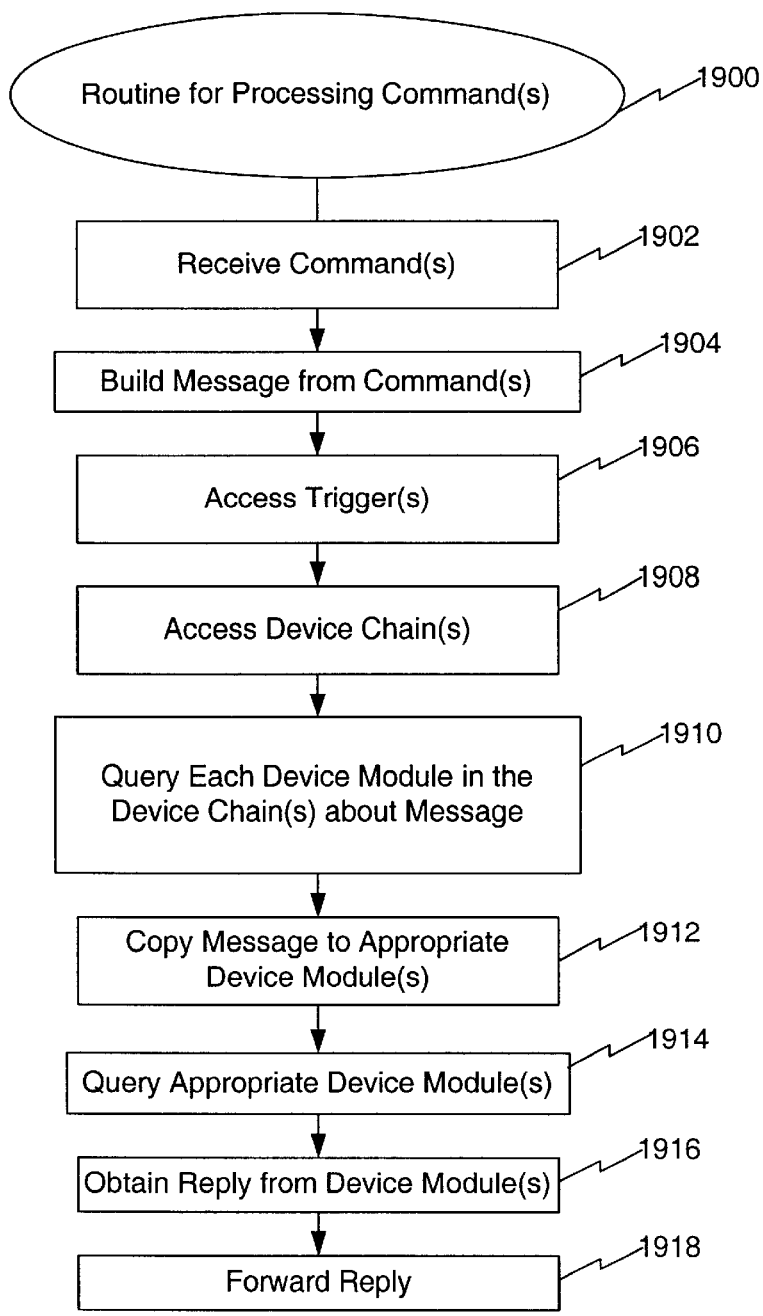
FIG. 19 shows a flowchart providing detailed operational steps for processing commands, according to an embodiment of the invention.

Referring to FIG. 19, a flowchart, providing detailed operational steps for processing commands, according to an embodiment of the invention, is shown.

In step 1902, message processing module 212 receives command(s).

In step 1904, message processing module 212 builds a message from the command(s).

In step 1906, DPF system 200 access triggers 206.

In step 1908, configuration manager 214 access device chains.

In step 1910, DPF system 200 queries each device module in the device chain(s).

In step 1912, DPF system 200 copies the message into the appropriate device module(s).

In step 1914, DPF system 200 queries the appropriate device module(s) to see if they have replies. In one embodiment, a reply is the result of a device module from processing a message.

In step 1916, DPF system 200 obtains the reply from each appropriate device module.

In step 1918, DPF system 200 forwards the reply. In one embodiment, the DPF system 200 forwards he reply to database 210 for storage. In another embodiment, DPF system 200 forwards the reply to one or more monitoring appliances for further processing.

The embodiments for the data propagation platform of the present invention described above are provided for purposes of illustration. These embodiments are not intended to limit the invention. Alternate embodiments, including the above described routines, differing slightly or substantially from those described herein, will be apparent to persons skilled in the relevant art(s) based on the teachings contained herein.

Example Computer System

Figure 22:
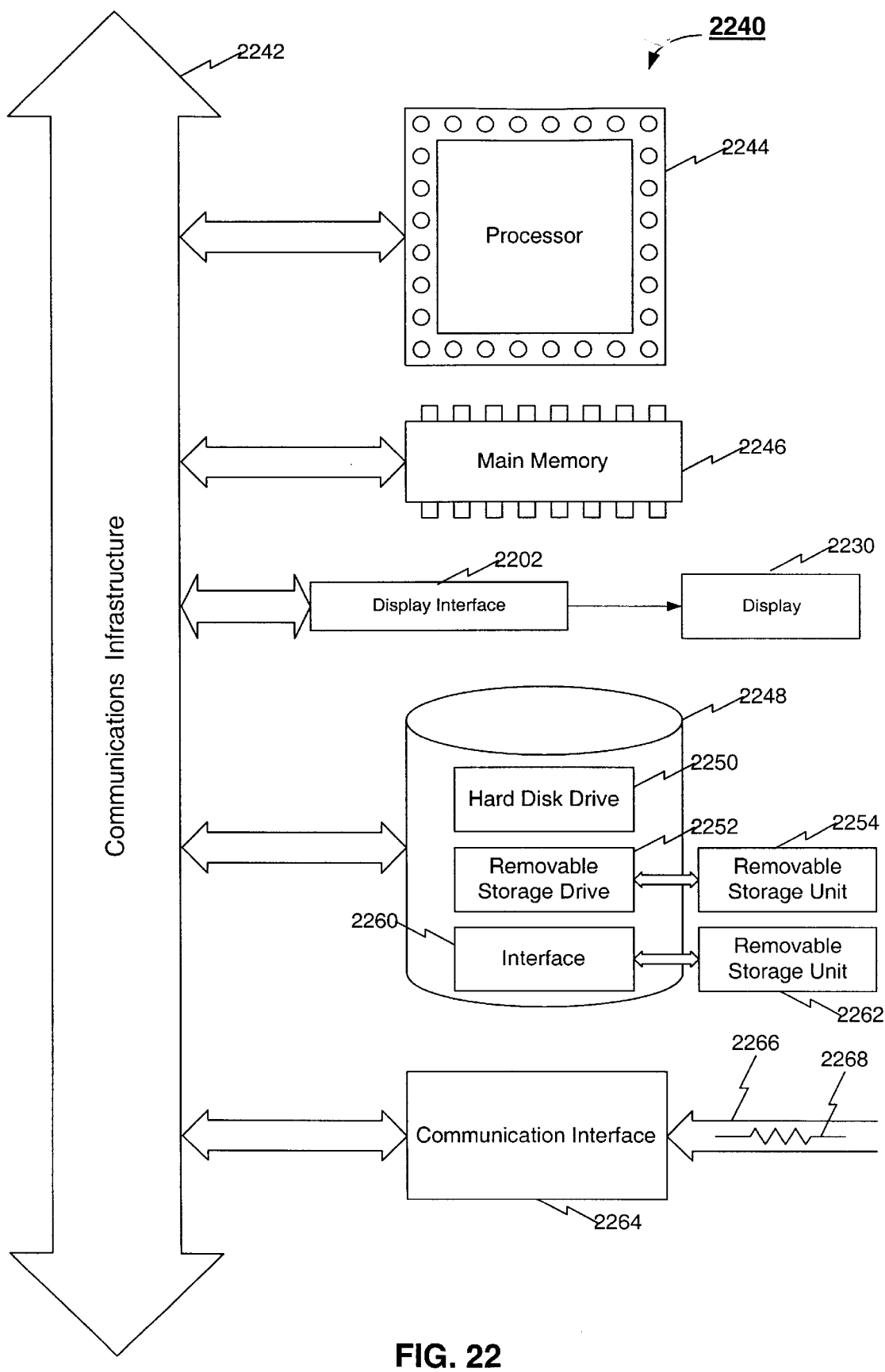
FIG. 22 shows an example of a computer system for implementing the invention.

An example of a computer system 2240 is shown in FIG. 22. The computer system 2240 represents any single or multi-processor computer. In conjunction, single-threaded and multi-threaded applications can be used. Unified or distributed memory systems can be used. Computer system 2240, or portions thereof, may be used to implement the present invention. For example, the DPF system 200 of the present invention may comprise software running on a computer system such as computer system 2240.

In one example, the DPF system 200 of the present invention is implemented in a multi-platform (platform independent) programming language such as JAVA 1.1, programming language/structured query language (PL/SQL), hyper-text mark-up language (HTML), practical extraction report language (PERL), common gateway interface/structured query language (CGI/SQL) or the like. Java™- enabled and JavaScrip™- enabled browsers are used, such as, Netscape™, HotJava™, and Microsoft™ Explorer™ browsers. Active content Web pages can be used. Such active content Web pages can include Java™ applets or ActiveX™ controls, or any other active content technology developed now or in the future. The present invention, however, is not intended to be limited to Java™, JavaScript™, or their enabled browsers, and can be implemented in any programming language and browser, developed now or in the future, as would be apparent to a person skilled in the art given this description.

In another example, the DPF system 200 of the present invention, including device chains 202a–202n and factories 208a–208n, may be implemented using a high-level programming language (e.g., C++) and applications written for the Microsoft Windows™ environment. It will be apparent to persons skilled in the relevant art(s) how to implement the invention in alternative embodiments from the teachings herein.

Computer system 2240 includes one or more processors, such as processor 2244. One or more processors 2244 can execute software implementing routines described above, such as shown in flowchart 1900. Each processor 2244 is connected to a communication infrastructure 2242 (e.g., a communications bus, cross-bar, or network). Various software embodiments are described in terms of this exemplary computer system. After reading this description, it will become apparent to a person skilled in the relevant art how to implement the invention using other computer systems and/or computer architectures.

Computer system 2240 can include a display interface 2202 that forwards graphics, text, and other data from the communication infrastructure 2242 (or from a frame buffer not shown) for display on the display unit 2230.

Computer system 2240 also includes a main memory 2246, preferably random access memory (RAM), and can also include a secondary memory 2248. The secondary memory 2248 can include, for example, a hard disk drive 2250 and/or a removable storage drive 2252, representing a floppy disk drive, a magnetic tape drive, an optical disk drive, etc. The removable storage drive 2252 reads from and/or writes to a removable storage unit 2254 in a well known manner. Removable storage unit 2254 represents a floppy disk, magnetic tape, optical disk, etc., which is read by and written to by removable storage drive 2252. As will be appreciated, the removable storage unit 2254 includes a computer usable storage medium having stored therein computer software and/or data.

In alternative embodiments, secondary memory 2248 may include other similar means for allowing computer programs or other instructions to be loaded into computer system 2240. Such means can include, for example, a removable storage unit 2262 and an interface 2260. Examples can include a program cartridge and cartridge interface (such as that found in video game devices), a removable memory chip (such as an EPROM, or PROM) and associated socket, and other removable storage units 2262 and interfaces 2260 which allow software and data to be transferred from the removable storage unit 2262 to computer system 2240.

Computer system 2240 can also include a communications interface 2264. Communications interface 2264 allows software and data to be transferred between computer system 2240 and external devices via communications path 2266. Examples of communications interface 2264 can include a modem, a network interface (such as Ethernet card), a communications port, interfaces described above, etc. Software and data transferred via communications interface 2264 are in the form of signals which can be electronic, electromagnetic, optical or other signals capable of being received by communications interface 2264, via communications path 2266. Note that communications interface 2264 provides a means by which computer system 2240 can interface to a network such as the Internet.

The present invention can be implemented using software running (that is, executing) in an environment similar to that described above with respect to FIG. 20. In this document, the term "computer program product" is used to generally refer to removable storage unit 2254, a hard disk installed in hard disk drive 2250, or a carrier wave carrying software over a communication path 2266 (wireless link or cable) to communication interface 2264. A computer useable medium can include magnetic media, optical media, or other recordable media, or media that transmits a carrier wave or other signal. These computer program products are means for providing software to computer system 2240.

Computer programs (also called computer control logic) are stored in main memory 2246 and/or secondary memory 2248. Computer programs can also be received via communications interface 2264. Such computer programs, when executed, enable the computer system 2240 to perform the features of the present invention as discussed herein. In particular, the computer programs, when executed, enable the processor 2244 to perform features of the present invention. Accordingly, such computer programs represent controllers of the computer system 2240.

The present invention can be implemented as control logic in software, firmware, hardware or any combination thereof. In an embodiment where the invention is implemented using software, the software may be stored in a computer program product and loaded into computer system 2240 using removable storage drive 2252, hard disk drive 2250, or interface 2260. Alternatively, the computer program product may be downloaded to computer system 2240 over communications path 2266. The control logic (software), when executed by the one or more processors 2244, causes the processor(s) 2244 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system for a data propagation platform, comprising:
one or more factories for the creation of at least one device module, wherein said one or more factories contain configuration information and feature implementation parameters;
a database for storing at least one configuration event and event handler;
one or more storelets for encapsulating procedural information, wherein said procedural information includes at least one control parameter for the operation of one or more servers, storage devices, or network devices;
one or more triggers for identifying at least one of a type, location, or specific data relating to said one or more servers, storage devices, or network devices; and
a configuration manager for receiving said at least one configuration event, wherein said configuration manager forwards said at least one configuration event to the proper event handler.

2. A system of claim 1, wherein said one or more storelets contain one or more bullets that can be attached to said one or more triggers; wherein said bullets contain at least one executable code segment to process data provided by said one or more triggers.

3. A system of claim 1, further comprising:
a message processing module for receiving one or more changes to one or more of said one or more factories, said database, said one or more storelets, said one or more triggers, and said configuration manager.

4. A system of claim 1, wherein said at least one event handler includes an event removal handler.

5. A system of claim 1, wherein said at least one event handler includes a notification handler.

6. A system of claim 1, wherein said at least one event handler includes a report handler.

7. A system of claim 1, further comprising:
a mapping module for removing data-flow operations from kernel memory space, wherein said data-flow operations are maintained in user memory space.

8. A method for processing commands in a data propagation platform, comprising the steps:
(1) receiving one or more commands from one or more servers, storage devices, or network devices;
(2) building a message from said one or more commands;

(3) accessing one or more triggers with said message;

(4) accessing one or more device chains with said message;

(5) querying one or more device modules in each of said one or more device chains about said message;

(6) copying said message to said one or more device modules, wherein only said one or more device modules that are designed to respond to said message receive a copy of said message;

(7) querying said one or more device modules that are designed to respond to said message for replies; wherein said replies include configuration information; and (8) obtaining said replies from said one or more device modules that are designed to respond to said message.

9. A method of claim 8, wherein said command is a small computer serial interface (SCSI) command.

10. A method of claim 8, wherein said configuration information includes current operating information about said one or more servers, storage devices, or network devices.

11. A method of claim 8, wherein said one or more device chains are operating in user memory space.

12. A computer program product comprising a computer usable medium having computer readable program code means embodied in said medium for causing an application program to execute on a computer that processes commands in a data propagation platform, said computer readable program code means comprising:

a first computer readable program code means for causing a computer to receive one or more commands from one or more servers, storage devices, or network devices;

a second computer readable program code means for causing a computer to build a message from said one or more commands;

a third computer readable program code means for causing a computer to access one or more triggers with said message;

a fourth computer readable program code means for causing a computer to access one or more device chains with said message;

a fifth computer readable program code means for causing a computer to query one or more device module in each of said one or more device chains about said message;

a sixth computer readable program code means for causing a computer to copy said message to said one or more device modules, wherein only said one or more device modules that are designed to respond to said message receive a copy of said message;

a seventh computer readable program code means for causing a computer to query said one or more device modules that are designed to respond to said message for replies; wherein said replies include configuration information, and an eighth computer readable program code means for causing a computer to obtain said replies from said one or more device modules that are designed to respond to said message.

13. A computer program product of claim 12, wherein said command is a small computer serial interface (SCSI) command.

14. A computer program product of claim 12, wherein said configuration information includes current operating information about said one or more servers, storage devices, or network devices.

15. A computer program product of claim 12, wherein said one or more device chains are operating in user memory space.

* * * * *